(12) United States Patent
Tsubota et al.

(10) Patent No.: US 8,194,128 B2
(45) Date of Patent: Jun. 5, 2012

(54) SURVEILLANCE DEVICE

(75) Inventors: Hirono Tsubota, Daito (JP); Yasunari Miyake, Daito (JP); Masahiro Takeshita, Daito (JP); Hideki Tanabe, Daito (JP); Yasuo Masaki, Daito (JP); Akinori Okazaki, Daito (JP); Yukiyoshi Sasao, Daito (JP)

(73) Assignee: Funai Electric Co., Ltd., Osaka (JP)

( * ) Notice: Subject to any disclaimer, the term of this patent is extended or adjusted under 35 U.S.C. 154(b) by 1475 days.

(21) Appl. No.: 11/726,692

(22) Filed: Mar. 22, 2007

(65) Prior Publication Data
US 2008/0024603 A1 Jan. 31, 2008

(30) Foreign Application Priority Data
Mar. 22, 2006 (JP) .................................. 2006-079144

(51) Int. Cl.
H04N 7/18 (2006.01)

(52) U.S. Cl. ...................................... 348/143; 725/105

(58) Field of Classification Search .................. 725/105; 348/143
See application file for complete search history.

(56) References Cited

U.S. PATENT DOCUMENTS
| | | | |
|---|---|---|---|
| 2007/0180482 A1* | 8/2007 | Frink et al. ...................... | 725/105 |
| 2008/0192129 A1* | 8/2008 | Walker et al. ............... | 348/231.2 |
| 2009/0121881 A1* | 5/2009 | Fredriksson et al. ...... | 340/573.4 |
| 2011/0249072 A1* | 10/2011 | Marks ........................... | 348/14.1 |

FOREIGN PATENT DOCUMENTS
| | | |
|---|---|---|
| JP | 2000-293774 | 10/2000 |
| JP | 2001-291176 | 10/2001 |
| JP | 2002-373210 | 12/2002 |
| JP | 2003-243189 | 8/2003 |
| JP | 2004-274296 | 9/2004 |

OTHER PUBLICATIONS

Patent Abstracts of Japan for Japanese Publication No. 2001-291176, Publication date Oct. 19, 2001 (1 page).
Patent Abstracts of Japan for Patent Publication No. 2002-373210, Publication date Dec. 26, 2002 (1 page).
Patent Abstracts of Japan for Japanese Publication No. 2000-293774, Publication date Oct. 20, 2000 (1 page).
Patent Abstracts of Japan for Japanese Publication No. 2003-243189, Publication date Aug. 29, 2003 (1 page).
Patent Abstracts of Japan for Japanese Publication No. 2004-274296, Publication date Sep. 30, 2004 (1 page).

* cited by examiner

*Primary Examiner* — Ajay Bhatia
*Assistant Examiner* — Bryan Lee
(74) *Attorney, Agent, or Firm* — Osha Liang LLP

(57) ABSTRACT

There is provided a surveillance device capable of transmitting an operation history of an appliance and image data while suppressing an increase in data transmission cost. A surveillance camera includes a control unit controlling an operation of the surveillance camera, a light receiving unit receiving an infrared signal transmitted from a remote controller, converting the infrared signal into an electric signal and sending the electric signal to the control unit, a storage unit storing image data, an image capturing unit performing an image capturing operation and sending an image signal generated by the image capturing operation to the storage unit, a time keeping unit generating time information concerning the surveillance camera and sending the information to the control unit, and a communication unit outputting data sent from the control unit to an external device.

11 Claims, 24 Drawing Sheets

FIG.4

| DATE AND TIME OF ACQUISITION | NAME OF APPLIANCE | DETAIL OF OPERATION |
|---|---|---|
| 2006-02-01 19:55:00 | LIGHTING FIXTURE | POWER-ON |
| 2006-02-01 19:50:00 | TELEVISION SET | POWER-ON |
| 2006-02-01 19:55:00 | TELEVISION SET | SELECT 8 CHANNEL |
| 2006-02-01 19:55:00 | TELEVISION SET | TURN VOLUME UP |
| 2006-02-01 20:00:00 | AIR CONDITIONER | POWER-ON |
| 2006-02-01 21:50:00 | TELEVISION SET | POWER-OFF |
| 2006-02-01 21:55:00 | AIR CONDITIONER | POWER-OFF |
| 2006-02-01 22:00:00 | LIGHTING FIXTURE | POWER-OFF |

| | |
|---|---|
| 2006-02-01 20:00 | image_001.jpg |
| 2006-02-01 22:00 | image_002.jpg |
| ... | ... |

| 710 | 720 |
|---|---|
| (HEADER)<br>SENDER : television@home<br>DESTINATION: mobile@office<br>DATE AND TIME OF<br>TRANSMISSION: 2006-02-01 23:00:00<br>DETAIL OF DATA: TRANSMISSION OF<br>OPERATION<br>HISTORY | (DATA)<br>TYPE OF DATA: OPERATION HISTORY<br>+ IMAGE<br>APPLIANCE: LIGHTING FIXTURE<br>DETAIL OF<br>OPERATION: POWER-OFF<br>DATE AND TIME<br>OF OPERATION: 2006-02-01 22:00:00 |

FIG.10

| DATE AND TIME OF ACQUISITION | NAME OF APPLIANCE | DETAIL OF OPERATION | OPERATOR CODE |
|---|---|---|---|
| ... | ... | ... | 1 |
| ... | ... | ... | 1 |
| 2006-02-01 19:55:00 | LIGHTING FIXTURE | POWER-ON | 10 |
| 2006-02-01 19:50:00 | TELEVISION SET | POWER-ON | 10 |
| 2006-02-01 19:55:00 | TELEVISION SET | SELECT 8 CHANNEL | 10 |
| 2006-02-01 19:55:00 | TELEVISION SET | TURN VOLUME UP | 10 |
| 2006-02-01 20:00:00 | AIR CONDITIONER | POWER-ON | 10 |
| 2006-02-01 21:50:00 | TELEVISION SET | POWER-OFF | 10 |
| 2006-02-01 21:55:00 | AIR CONDITIONER | POWER-OFF | 10 |
| 2006-02-01 22:00:00 | LIGHTING FIXTURE | POWER-OFF | 10 |
| ... | ... | ... | ... |

| TRANSMISSION DESTINATION | TRANSMISSION MODE |
|---|---|
| FRIEND OF CHILD | TRANSMIT OPERATION HISTORY BY MISS "A" IN PAST XX MINUTES |
| MOTHER | TRANSMIT ALL OPERATION HISTORIES IN PAST XX MINUTES |
| FATHER | DETERMINE DETAIL OF TRANSMISSION IN ACCORDANCE WITH COMMAND UPON REQUEST OF HISTORY TRANSMISSION |

| 440 | 450 |
|---|---|
| 2006-02-01 20:00 | image_001.jpg |
| 2006-02-01 22:00 | image_002.jpg |
| ... | ... |

FIG.20

| HEADER<br>SENDER (= SERVER)<br>DESTINATION<br>(= TELEVISION SET)<br>DATE AND TIME OF<br>TRANSMISSION<br>DETAIL OF DATA:<br>TRANSMISSION OF<br>APPLIANCE INFORMATION | DATA DETAIL<br><br>MANUFACTURER'S CODE: ABC INC.<br>NAME OF APPLIANCE: TELEVISION SET<br>MODEL NUMBER: 1234<br>APPLIANCE INFORMATION:<br>product-info.text, product-image.jpg, bgm.audio |
|---|---|

SURVEILLANCE DEVICE

BACKGROUND OF THE INVENTION

1. Field of the Invention

The present invention relates to a surveillance device. More particularly, the present invention relates to a surveillance device capable of transmitting an image.

2. Description of the Background Art

An image capturing device becomes widely available and, therefore, is used as a surveillance camera frequently. A surveillance camera is not only used for crime prevention, but also is used for watching living conditions of a person who lives alone. An image captured by the surveillance camera is transferred to another information communication device via, for example, a network.

For example, Japanese Patent Laying-Open No. 2001-291176 discloses an abnormality monitoring device capable of promptly sensing abnormal action of a care receiver without necessity that a care giver constantly watches the care receiver.

Japanese Patent Laying-Open No. 2002-373210 discloses a living activity level evaluation system capable of accumulating a daily living activity level of a person to be measured, such as an elder person, without effort while ensuring privacy of the person to be measured, and evaluating the living activity level.

Japanese Patent Laying-Open No. 2000-293774 discloses a safety confirmation device capable of confirming safety of an elder person who lives alone with ease and with certainty.

Japanese Patent Laying-Open No. 2003-243189 discloses a lighting system capable of operating a lighting fixture, confirming an operation status of such a lighting fixture, preventing crime and confirming safety of a resident from a remote place.

Japanese Patent Laying-Open No. 2004-274296 discloses an information processing system for safety confirmation which is easily used and introduced by an elder person who lives alone.

However, if the surveillance camera is actuated constantly so as to perform constant image data transfer, there is a possibility that a communication line is occupied. In a case of using a general line, further, there arises a problem of an increase in communication cost.

SUMMARY OF THE INVENTION

The present invention is devised in order to solve the aforementioned problems. An object of the present invention is to provide a surveillance device capable of making a notification about a condition of a user of an appliance without increasing communication cost.

In order to accomplish this object, according to one aspect of the present invention, a surveillance device includes: an image capturing unit capturing an image of a subject and outputting an image signal; a light receiving unit receiving an infrared signal having control data for controlling an operation of an appliance; a storage unit storing the control data contained in the infrared signal received by the light receiving unit, and access data for communication with an information communication device registered previously; a time keeping unit detecting a time; a control unit sending a signal for instructing the image capturing unit to perform the image capturing operation when the light receiving unit receives no infrared signal for a predetermined period of time; and a transmission unit, connected to a communication line, transmitting the image signal generated on the basis of the image captured by the image capturing unit to the information communication device registered previously via the communication line on the basis of the access data.

According to another aspect of the present invention, a surveillance device includes: an image capturing unit capturing an image of a subject and outputting an image signal; a light receiving unit receiving an infrared signal having control data for controlling an operation of an appliance; a storage unit storing the control data contained in the infrared signal received by the light receiving unit; a control unit causing the image capturing unit to perform the image capturing operation on the basis of a history of reception of the infrared signal; and a transmission unit, connected to a communication line, transmitting the image signal generated on the basis of the image captured by the image capturing unit to an information communication device registered previously via the communication line.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 4 conceptually shows one example of data stored in a storage unit 230 of surveillance camera 100.

FIG. 7 conceptually shows a configuration of a packet 700 transmitted from surveillance camera 100 to portable telephone 180.

FIG. 10 conceptually shows one example of data storage in a storage unit 230 of a surveillance camera 100 according to a second embodiment of the present invention.

FIG. 20 conceptually shows a configuration of a packet 1900 transmitted from appliance-information management server 1510 to surveillance camera 1500.

DESCRIPTION OF THE PREFERRED EMBODIMENTS

Figure 1:
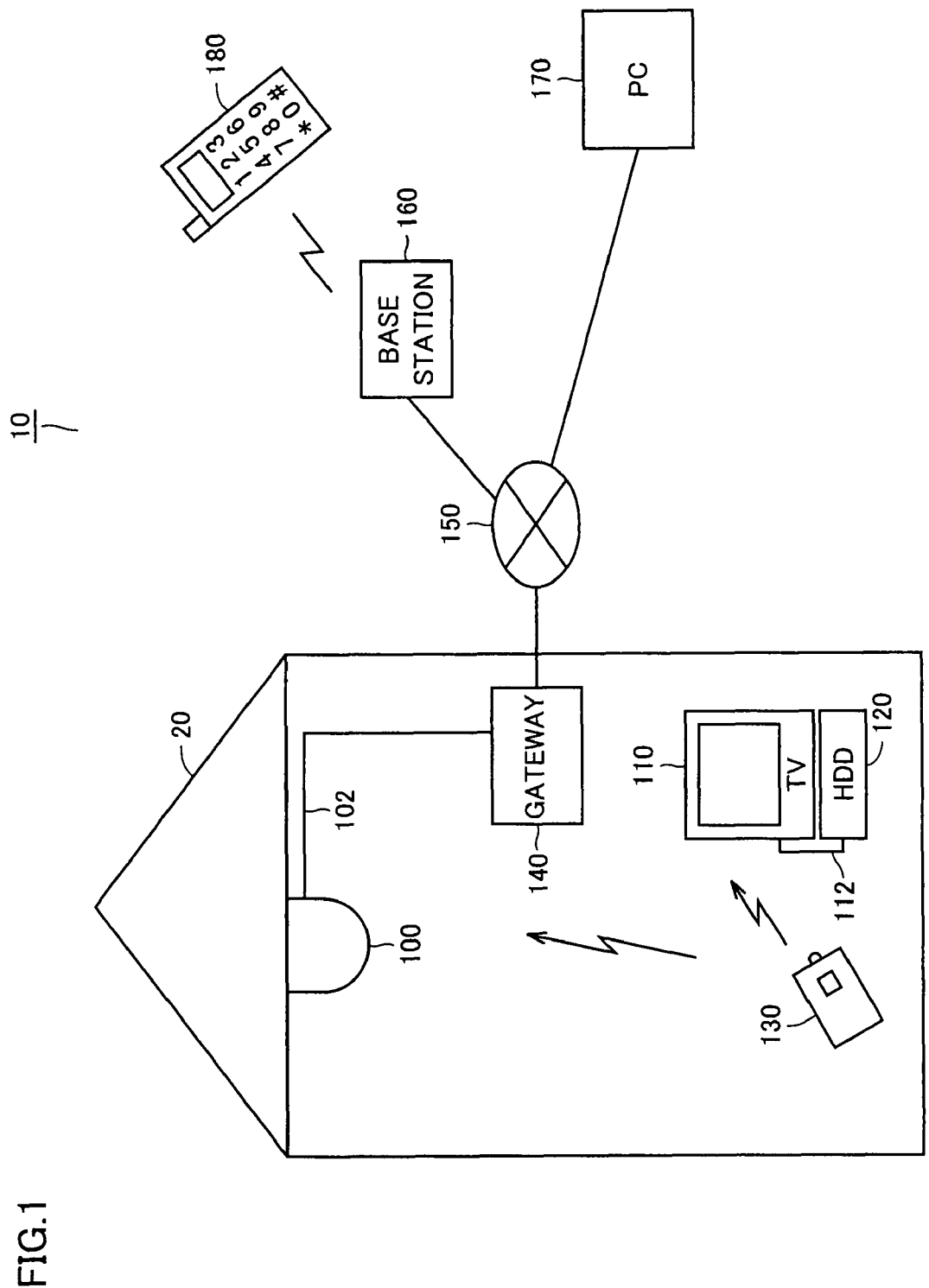
FIG. 1 shows a system configuration of a surveillance system 10 using a surveillance camera 100 according to a first embodiment of the present invention.

With reference to the drawings, hereinafter, description will be given of preferred embodiments of the present invention. In the following description, identical components are denoted by identical reference numerals and are provided with identical designations and functions; therefore, detailed description thereof will not be given repeatedly.

First Embodiment

Hereinafter, description will be given of a first embodiment of the present invention.

With reference to FIG. 1, a surveillance system 10 has a surveillance camera 100 installed in a house 20, a remote controller 130, a gateway 140, a television set 110, an HDD (Hard Disk Drive) recorder 120, a base station 160, a PC (Personal Computer) 170 and a portable telephone 180. Surveillance camera 100 and gateway 140 are connected to each other via a cable 102. Gateway 140 is connected to base station 160 and PC 170 on the Internet 150. Portable telephone 180 is communicatable with base station 160. Television set 110 and HDD recorder 120 are connected to each other via a cable 1112.

Surveillance camera 100 is installed on, for example, a ceiling of a room such as a living room in house 20. The installation position is not limited to the ceiling, and surveillance camera 100 may be installed on a corner or a wall of the room. Alternatively, surveillance camera 100 may be installed on an upper portion of a housing of television set 110. Moreover, surveillance camera 100 may be mounted on a plane. In this case, surveillance camera 100 may have a housing formed so as to look like a real camera. With this configuration, a resident of house 20 is hardly conscious of the presence of surveillance camera 100 and, therefore, is hardly subject to a stress.

Remote controller 130 is, for example, a remote controller capable of controlling television set 110. In another aspect, remote controller 130 may be a so-called multi remote controller capable of controlling another electronic appliance such as HDD recorder 112 in addition to television set 110. Remote controller 130 emits an infrared signal within a range of preset directivity. Concretely, when a user of remote controller 130 operates remote controller 130 toward television set 110, an infrared signal transmitted based on the operation is not only received by television set 110, but also is received by surveillance camera 100 installed on the ceiling in house 20.

Figure 2:
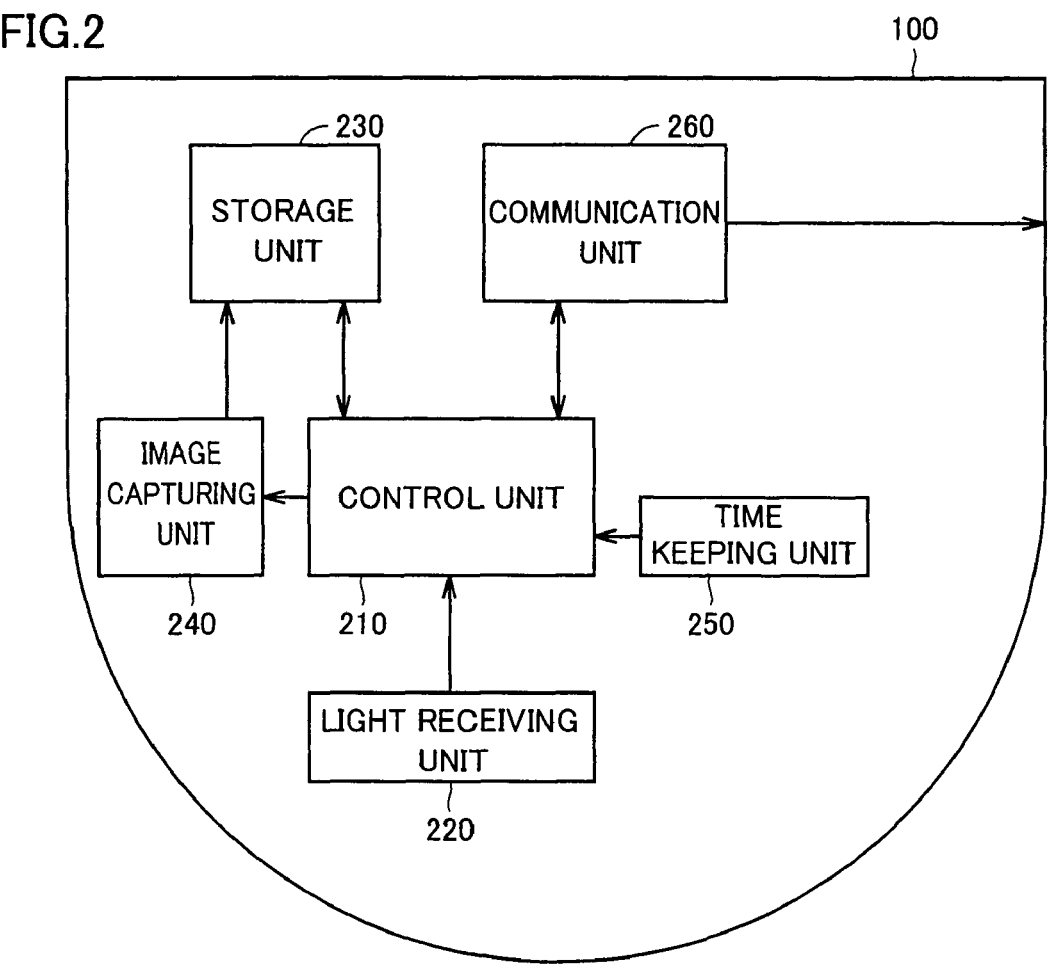
FIG. 2 is a block diagram showing a configuration of functions of surveillance camera 100.

With reference to FIG. 2, description will be given of a configuration of surveillance camera 100. Surveillance camera 100 includes a control unit 210, a light receiving unit 220, a storage unit 230, an image capturing unit 240, a time keeping unit 250 and a communication unit 260.

Light receiving unit 220 receives an infrared signal transmitted by remote controller 130, converts the infrared signal into an electric signal, and sends the electric signal to control unit 210. Time keeping unit 250 receives electric power to generate time information concerning surveillance camera 100, and sends the time information to control unit 210. Herein, time keeping unit 250 may be realized as an internal clock in control unit 210.

Storage unit 230 is realized by using, for example, a flash memory. Any other nonvolatile storage medium may be used as storage unit 230. In addition, any other removable recording medium such as a memory card may be used as storage unit 230. In order to realize surveillance camera 100, storage unit 230 stores data inputted previously. Storage unit 230 also stores image data sent from image capturing unit 240. Further, storage unit 230 stores control data contained in an infrared signal received by light receiving unit 220.

Control unit 210 receives electric power to control operations of surveillance camera 100. Control unit 210 is realized as a processor which executes a program for realizing each processing. Alternatively, control unit 210 may be realized by a combination of circuit elements for realizing each processing. Concretely, control unit 210 reads a control code from an electric signal sent from light receiving unit 220 based on the electric signal, and stores the control code in an area secured previously in storage unit 230. Control unit 210 relates time information sent from time keeping unit 250 with the aforementioned control data and, then, stores the resultant in storage unit 230. Further, control unit 210 instructs image capturing unit 240 to perform an image capturing operation on the basis of information from time keeping unit 250.

Image capturing unit 240 is realized by using, for example, a CCD (Charge Coupled Device) or a CMOS (Complementary Metal-Oxide Semiconductor). Image capturing unit 240 performs an image capturing operation in an image capturing mode prescribed on the basis of a command outputted from control unit 210, and sends an image signal generated by this image capturing operation to storage unit 230. Herein, the image capturing mode may be changeable in accordance with an installation environment of surveillance camera 100.

Communication unit 260 is connected to cable 102 for network communication. Communication unit 260 transmits data sent from control unit 210 to cable 102. In another aspect, communication unit 260 receives data transmitted from an external device, and transfers the data to control unit 210.

Figure 3:
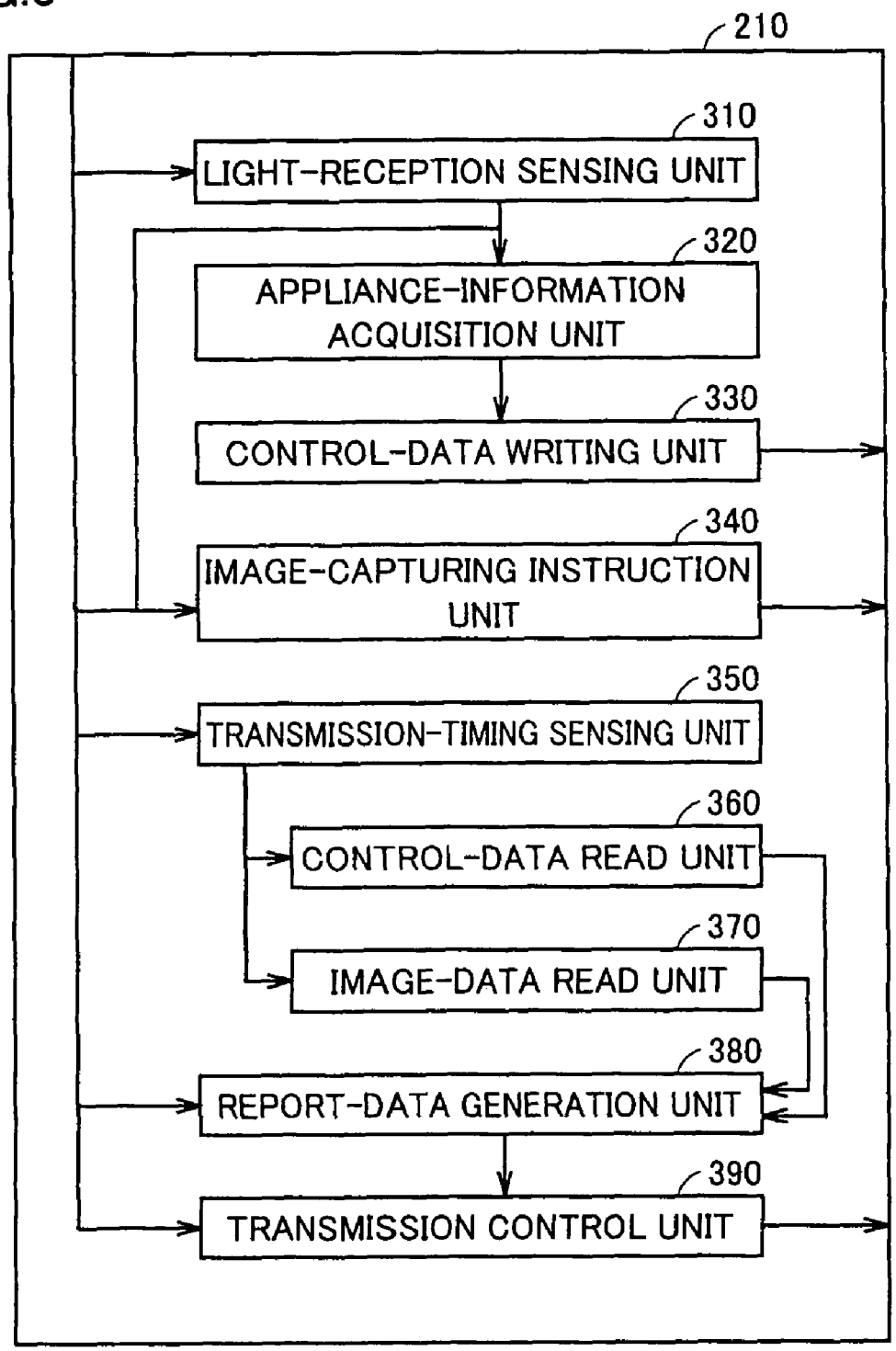
FIG. 3 is a block diagram showing a configuration of functions performed by a control unit 210 of surveillance camera 100.

With reference to FIG. 3, description will be given of a configuration of control unit 210. Control unit 210 includes a light-reception sensing unit 310, an appliance-information acquisition unit 320, a control-data write unit 330, an image-capturing instruction unit 340, a transmission-timing sensing unit 350, a control-data read unit 360, an image-data read unit 370, a report-data generation unit 380 and a transmission control unit 390.

Light-reception sensing unit 310 senses a fact that light receiving unit 220 received an infrared signal transmitted from remote controller 130, on the basis of an electric signal sent from light receiving unit 220. Appliance-information acquisition unit 320 acquires control data contained in the electric signal on the basis of the result of the sensing by light-reception sensing unit 310. Control-data write unit 330 writes the control data acquired by appliance-information acquisition unit 320 to an area secured previously in storage unit 230.

Image-capturing instruction unit 340 instructs image capturing unit 240 to perform an image capturing operation in a prescribed image capturing mode, on the basis of the result of the sensing by light-reception sensing unit 310. Alternatively, image-capturing instruction unit 340 senses an image capturing timing on the basis of time information from time keeping unit 250, and instructs image capturing unit 240 to perform an image capturing operation in response to the sensing of the image capturing timing.

Transmission-timing sensing unit 350 senses a timing at which an infrared signal transmitted by remote controller 130 or an operation history of remote controller 130 is transmitted to another information communication device (such as portable telephone 180 or PC 170) configuring surveillance system 10. Transmission-timing sensing unit 350 senses the data transmission on the basis of, for example, arrival of a time designated previously. Alternatively, transmission-timing sensing unit 350 senses a fact that an appliance designated previously is operated, thereby to sense the timing. In another aspect, transmission-timing sensing unit 350 senses a fact that signals from remote controller 130 have not been received for a predetermined period of time, thereby to sense a history transmission timing.

In another aspect, the history transmission timing may be determined in accordance with a type of an appliance operated by remote controller 130. For example, the history transmission timing may be determined on the basis of data for recognizing an appliance (so-called appliance code) which is acquired by appliance-information acquisition unit 320. In this case, further, image-capturing instruction unit 340 may issue a command for image capturing to image capturing unit 240.

If an appliance is television set 110, for example, when television set 110 is tuned on/off, transmission-timing sensing unit 350 may determine such a point in time as the history transmission timing. Herein, image-capturing instruction unit 340 issues a command for image capturing to image capturing unit 240. With this configuration, an image of an operation of an appliance is acquired and, then, is transmitted together with a history. Accordingly, it is possible to grasp action of a resident in house 20 with good accuracy.

Herein, the appliance is not limited to television set 110, and may be HDD recorder 120, a lighting fixture (not shown), an air conditioner (not shown) or the like.

Control-data read unit 360 reads an operation history (control data) of remote controller 130 from storage unit 230 on the basis of the result of the sensing by transmission-timing sensing unit 350. Image-data read unit 370 reads image data from storage unit 230 on the basis of the result of the sensing by transmission-timing sensing unit 350. The control data and the image data are stored in a temporal working area secured in storage unit 230.

Report-data generation unit 380 generates a packet for network transmission through the use of the control data read by control-data read unit 360 and the image data read by image-data read unit 370. Concretely, report-data generation unit 380 refers to data for specifying a transmission destination, which is stored in storage unit 230, (e.g., a network address of portable telephone 180 or PC 170) and generates a packet containing the data.

Transmission control unit 390 instructs communication unit 260 to transmit the packet generated by report-data generation unit 380, on the basis of the fact that time keeping unit 250 senses the arrival of the transmission timing. If there is no establishment of connection between surveillance camera 100 and an external network, the connection is established by such a command. Communication unit 260 sends the packet to the Internet 150 after the establishment of the connection.

With reference to FIG. 4, description will be given of a data structure of surveillance camera 100. FIG. 4 conceptually shows one example of data stored in storage unit 230. Storage unit 230 includes areas 410 to 450 each storing data.

Area 410 stores data about date and time at which remote controller 130 is operated. Area 420 stores data for specifying an appliance controlled by the operation of remote controller 130, in the form of, for example, a designation of the appliance. Area 430 stores data about a detail of the operation. The data stored in area 410, the data stored in area 420 and the data stored in area 430 are related with each other. Accordingly, an item of data stored in any of the areas is used as a search key, so that a specific item of data used for transmission can be specified.

Storage unit 230 stores image data in addition to the aforementioned operation history. Concretely, area 440 stores data about image capturing date and time. Area 450 stores image data generated by an image capturing operation performed at the date and time. Herein, the date and time stored in area 410 and the time data stored in area 440 are generated on the basis of the same time information. Accordingly, when a history of a specific operation is acquired and an image of the specific operation is captured, thereafter, data about the history and data about the image can be specified while being related with each other.

Referring to area 410, concretely, a history of each operation is acquired when each appliance is controlled. For example, a history acquired at 20:00 on Feb. 1, 2006 indicates that an air conditioner is turned on at such a point in time. At the same time, image data (image__001.jpg) is generated as shown in area 440. Accordingly, an operation of remote controller 130 and an image capturing operation by surveillance camera 100 are performed concurrently at this point in time.

If surveillance camera 100 is installed on the ceiling, a range where image capturing unit 240 can capture an image covers the entire room. Accordingly, a condition of a user who operates remote controller 130 can be easily grasped by an image captured by image capturing unit 240.

Figure 5:
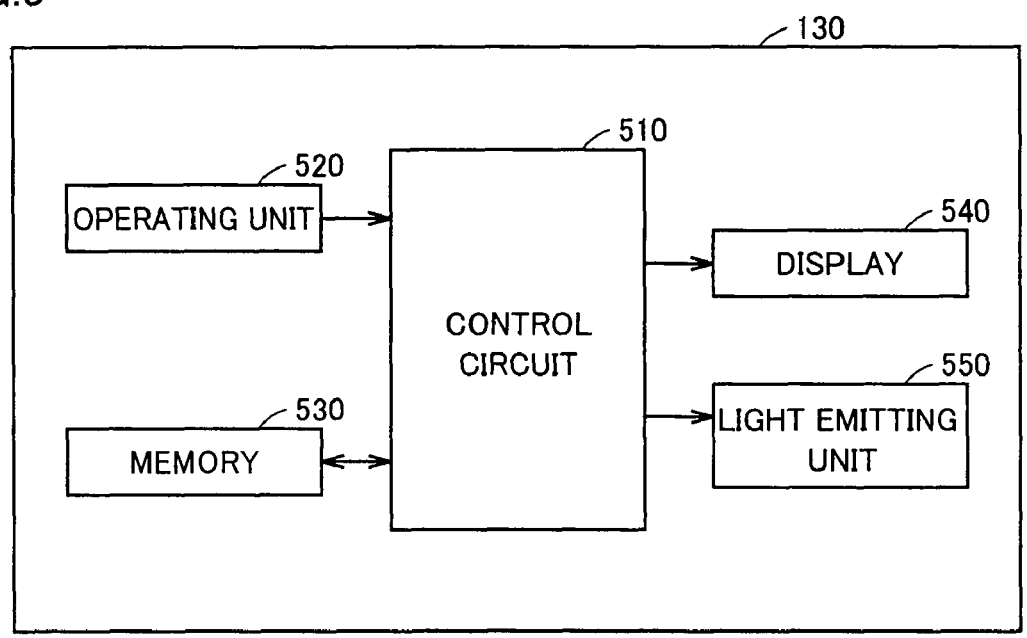
FIG. 5 is a block diagram showing a hardware configuration of a remote controller 130.

With reference to FIG. 5, description will be given of a configuration of remote controller 130. Remote controller 130 mainly includes a control circuit 510, an operating unit 520, a memory 530, a display 540 and a light emitting unit 550.

Control circuit 510 receives electric power from a battery (not shown) to control operations for actuating remote controller 130. Concretely, control circuit 510 reads data stored in memory 530 on the basis of a signal outputted from operating unit 520, and instructs light emitting unit 550 to generate and emit an infrared signal.

Operating unit 520 takes a form of, for example, a button provided outside a housing of remote controller 130. If remote controller 130 functions as a remote controller capable controlling a plurality of appliances, operating unit 520 may include a specific button for accepting selection as a remote controller for a specific appliance.

Memory 530 stores data inputted previously in order to perform an operation prescribed in remote controller 130. For example, memory 530 stores control data for instruction of an operation of television set 110 while relating the control data with each button configuring operating unit 520. Alternatively, if remote controller 130 functions as a remote controller capable controlling a plurality of appliances, memory 530 stores control data for specifying a concrete operation of each appliance and data for specifying each appliance while relating the control data with the data. In this case, when a user of remote controller 130 performs a selecting operation through operating unit 520, remote controller 130 reads control data of a selected appliance from memory 530 and generates an infrared signal, as a remote controller for controlling the selected appliance.

Display 540 displays character information on the basis of data outputted from control circuit 510. The character information includes information about a detail of control to be transmitted by remote controller 130, information about a status of remote controller 130, and the like. For example, when the user performs the selecting operation through remote controller 130 as a remote controller for controlling a specific appliance, data about an appliance controlled by the selection is displayed on display 540.

Light emitting unit 550 converts an electric signal into an infrared signal and emits the infrared signal externally on the basis of a signal sent from control circuit 510. Light emitting unit 550 has wide directivity within a preset range as described above. Accordingly, even when the user of remote controller 130 operates remote controller 130 toward television set 110, an infrared signal transmitted at this time propagates toward the ceiling. Thus, surveillance camera 100 installed on the ceiling can receive the infrared signal transmitted from remote controller 130.

Figure 6:
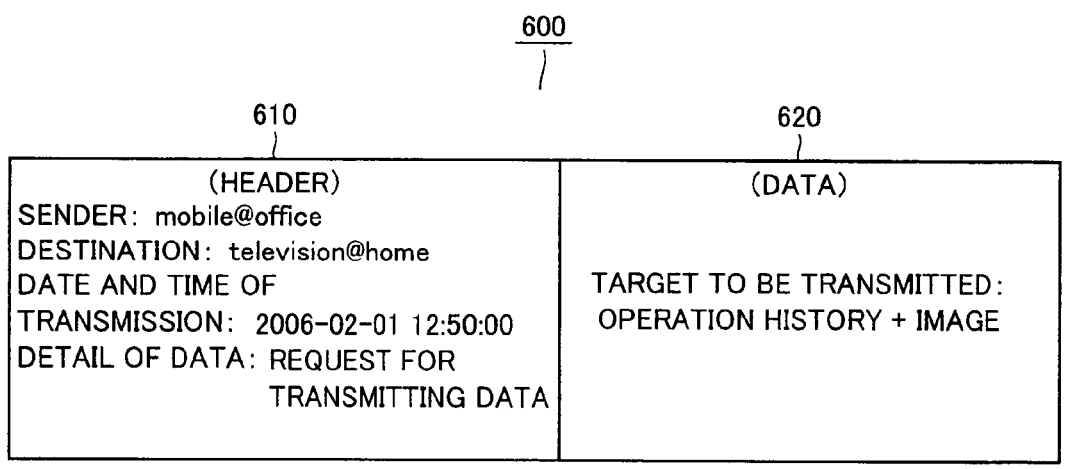
FIG. 6 conceptually shows a configuration of a packet 600 transmitted from a portable telephone 180 to surveillance camera 100.

With reference to FIGS. 6 and 7, description will be given of communications between surveillance camera 100 and another information communication device. FIG. 6 conceptually shows a configuration of a packet 600 transmitted from portable telephone 180 to surveillance camera 100. Packet 600 contains a header 610 and data 620.

Header 610 contains data for specifying a sender of packet 600 (e.g., an address previously allocated to portable telephone 180 on the network), data for specifying a destination of packet 600 (e.g., an address of surveillance camera 100 on the network), date and time of transmission of packet 600, and attribute data about a detail of packet 600.

Data 620 contains a concrete data item related with an attribute contained in header 610. For example, data 620 contains data indicating that targets to be transmitted are "operation history" and "image".

Packet 600 is generated by a CPU (not shown) of portable telephone 180. The CPU generates packet 600 on the basis of an operation of portable telephone 180 by a user. Concretely, the user of portable telephone 180 carries out a prescribed connection procedure, so that portable telephone 180 establishes a connection with the Internet 150 and accesses surveillance camera 100. Portable telephone 180 accessing surveillance camera 100 transmits packet 600 to surveillance camera 100.

With reference to FIG. 7, a packet 700 transmitted from surveillance camera 100 to portable telephone 180 contains a header 710 and data 720.

Header 710 contains data for specifying a sender of packet 700 (e.g., an address of surveillance camera 100 on the network), data for specifying a destination of packet 700 (e.g., an address of portable telephone 180 on the network), date and time of transmission of packet 700, and an attribute indicating a detail of packet 700.

Data 720 has an item related with an attribute contained in header 710, as a concrete data item. Concretely, data 720 contains data indicating that types of the data are "operation history" and "image", data indicating an appliance to be operated (e.g., a lighting fixture), data indicating a detail of an operation (e.g., power-off), and data indicating date and time at which the appliance is operated. Herein, the appliance to be operated is an appliance operated by remote controller 130 when image capturing unit 240 performs an image capturing operation.

Packet 700 is generated by control unit 210 of surveillance camera 100. Concretely, control unit 210 generates packet 700 as appliance-information acquisition unit 320. Control unit 210 transmits packet 700 generated as described above to the Internet 150 through communication unit 260 as communication control unit 330. If there is established a connection between surveillance camera 100 and portable telephone 180, packet 700 is received by portable telephone 180.

Figure 8:
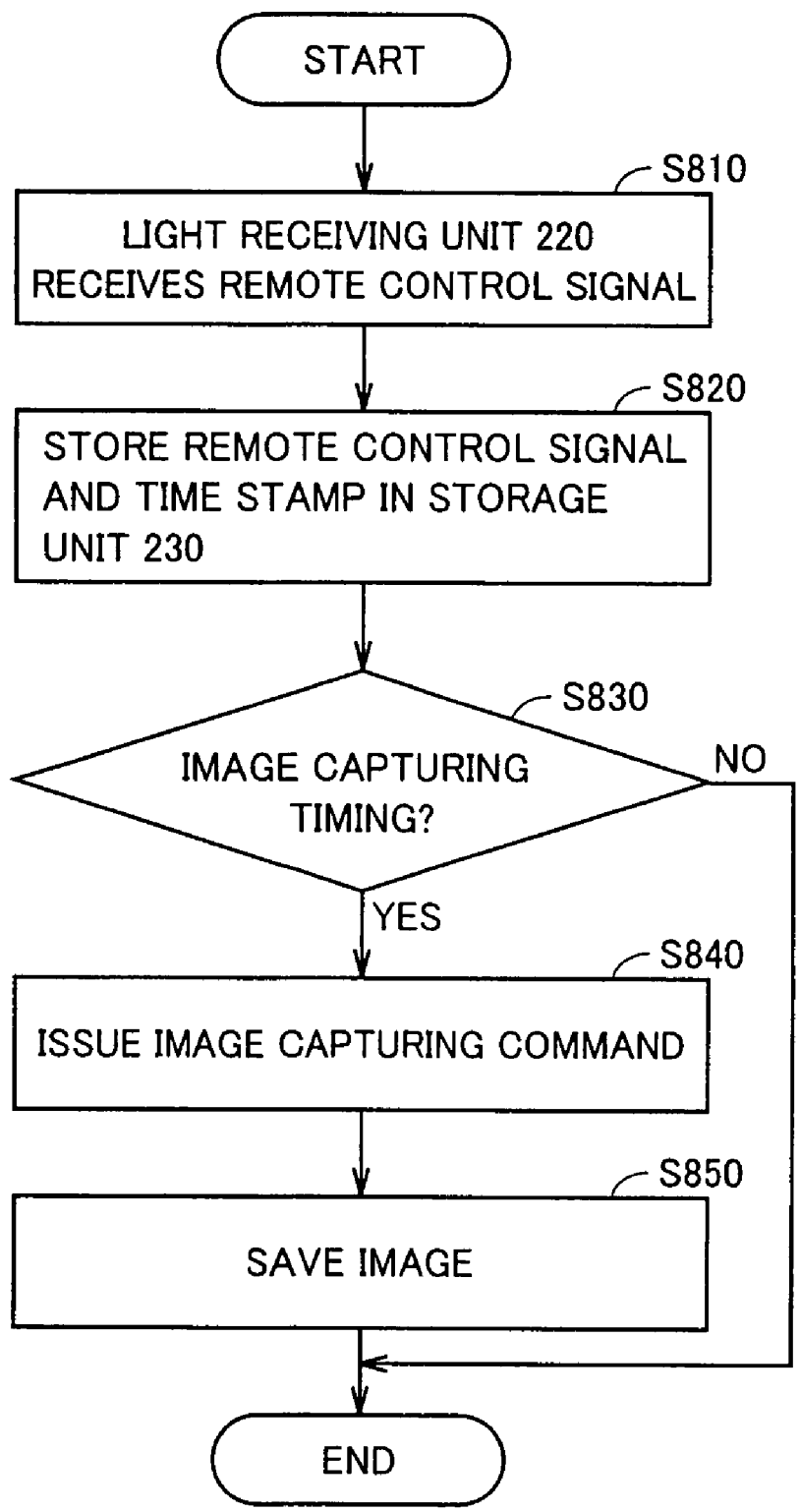
FIG. 8 is a flowchart showing a procedure of processing performed by surveillance camera 100 upon reception of an infrared signal transmitted from remote controller 130.
Figure 9:
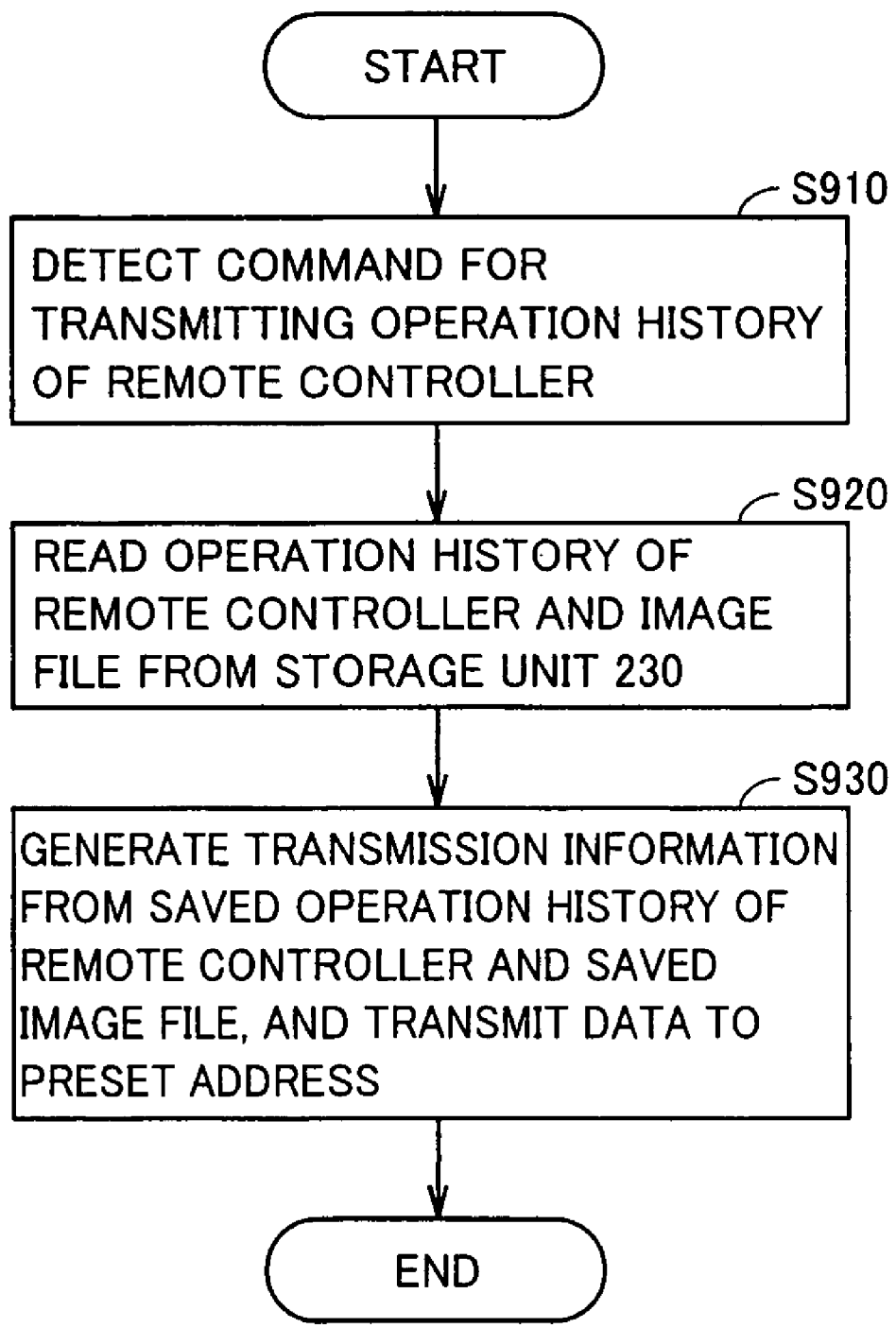
FIG. 9 is a flowchart showing a procedure of processing performed by surveillance camera 100 in order to transmit data stored in storage unit 230.

With reference to FIGS. 8 and 9, description will be given of a control structure of surveillance camera 100. FIG. 8 is a flowchart showing a procedure of processing performed by surveillance camera 100 upon reception of an infrared signal transmitted from remote controller 130.

In step S810, light receiving unit 220 of surveillance camera 100 receives an infrared signal transmitted by remote controller 130. Light receiving unit 220 converts the infrared signal into an electric signal and sends the electric signal to control unit 210.

In step S820, control unit 210 relates the signal sent from light receiving unit 220 with time data (a time stamp) acquired from an internal clock (not shown), and stores the resultant in storage unit 230 (FIG. 4).

In step S830, control unit 210 determines whether or not it is an image capturing timing now, on the basis of the signal. This determination is based on whether or not an infrared signal having a specific detail of control is received. Examples of the specific detail of control include power-on/power-off of television set 110, HDD recorder 120 or the air conditioner (not shown), selection of a channel, a change in volume, and the like. Storage unit 230 stores data about each detail of control, and control unit 210 determines whether or not an infrared signal corresponding to the data is received. When control unit 210 determines that it is an image capturing timing now (YES in step S830), the control proceeds to step S840. If not (NO in step S840), the control is finished.

In step S840, control unit 210 issues an image capturing command to image capturing unit 240. On the basis of the command, image capturing unit 240 performs an image capturing operation in a preset image capturing mode.

In step S850, control unit 210 issues a command for storing image data outputted from image capturing unit 240 to storage unit 230. Thus, the image data is related with the time data and, then, is stored in an area secured in storage unit 230. If a plurality of image data, numbers for recognizing each data are automatically allocated to the plurality of image data while being related with the plurality of image data.

FIG. 9 is a flowchart showing a procedure of processing performed by surveillance camera 100 in order to transmit data stored in storage unit 230. This processing is performed when control unit 210 senses the arrival of a predetermined time on the basis of the time data from the internal clock or when control unit 210 accepts a data transmission request through communication unit 260.

In step S910, control unit 210 detects a command for transmitting an operation history of remote controller 130. The detection is performed at a predetermined time or is performed on the basis of a history transmission request transmitted from portable telephone 180 or PC 170. In step S920, control unit 210 reads an operation history from a nonvolatile area of storage unit 230, and stores the operation history in the temporal working area of storage unit 230.

In step S930, control unit 210 generates transmission information from the operation history and an address previously stored in storage unit 230. The address stored in storage unit 230 is, for example, data inputted upon installation of surveillance camera 100 (e.g., an electronic mail address used by portable telephone 180). Alternatively, the address may be an address indicating an transmitter of an electronic mail received through communication unit 260. Control unit 210 transmits the generated transmission information as history data to an external device through communication unit 260.

As a result, if surveillance camera 100 is communicatable with another information communication device (e.g., portable telephone 180 or PC 170), the data is transmitted to the information communication device. A user of portable telephone 180 or PC 170 can read the data in the form of an electronic mail and can ascertain an appliance operating status grasped by surveillance camera 100.

With this configuration, data shown in FIG. 7 is also sent to another user existing outside house 20. Accordingly, it is possible to easily ascertain a condition of a member of a family from a remote place. In the example shown in FIG. 7, data 720 contained in packet 700 contains an operation history at a specific timing and an image captured at the timing. Such data corresponds to a latest history and a latest image if a history transmission request is accepted by surveillance camera 100. Thus, it is possible to ascertain a condition of the user of remote controller 130 in conjunction with an image from a remote place.

However, a history at another time may be transmitted. For example, a latest history may be transmitted at intervals of one hour every day.

As described above, surveillance camera 100 according to this embodiment acquires operation information from a signal transmitted from remote controller 130, and transmits an operation history through the communication line. With this configuration, power-on/power-off of television set 110, selection of a channel in television set 110, and the like are notified to a person other than an operator; therefore, a family of the operator and a person concerned can ascertain a condition of the operator. Accordingly, for example, it is possible to aid in ascertainment of safety. According to this embodiment, an image signal is not transmitted constantly, but is transmitted while being contained in a packet. With this configuration, a band of a communication line is not used more than necessary and therefore, an increase in communication cost is suppressed. In addition, tuning information about television set 110 can be transmitted. Therefore, if the operator and the family thereof watch a single TV program, the user of PC 170 or portable telephone 180 can share topics on the TV program with the operator of the television set 110.

Second Embodiment

A surveillance camera according to a second embodiment is different from the surveillance camera according to the first embodiment in the following point. That is, the surveillance camera according to this embodiment has a function of selectively configuring an operation history to be transmitted, in accordance with a person who transmits a request for transmitting an operation history of a remote controller. It is to be noted that a television set in this embodiment has a hardware configuration equal to that of surveillance camera 100 according to the first embodiment, and functions thereof are also equal to those in the first embodiment. Therefore, description thereof will not be given repeatedly.

With reference to FIG. 10, description will be given of a data structure of surveillance camera 100 according to this embodiment. FIG. 10 conceptually shows one example of data storage in storage unit 230. Storage unit 230 includes areas 1010 to 1060 each storing data in addition to areas 450 and 460.

Area 1010 stores data about date and time at which an operation history of a remote controller 130 or a remote controller 132 is acquired. Area 1020 stores data for specifying an appliance controlled by the operation. Area 1030 stores data about a detail of the operation. Area 1040 stores data about a user performing the operation in the form of, for example, an operator code. Area 1050 stores a transmission destination of a history, which is registered previously in order to selectively transmit an operation history. Area 1060 stores a target of a history related with the transmission destination.

Figure 11:
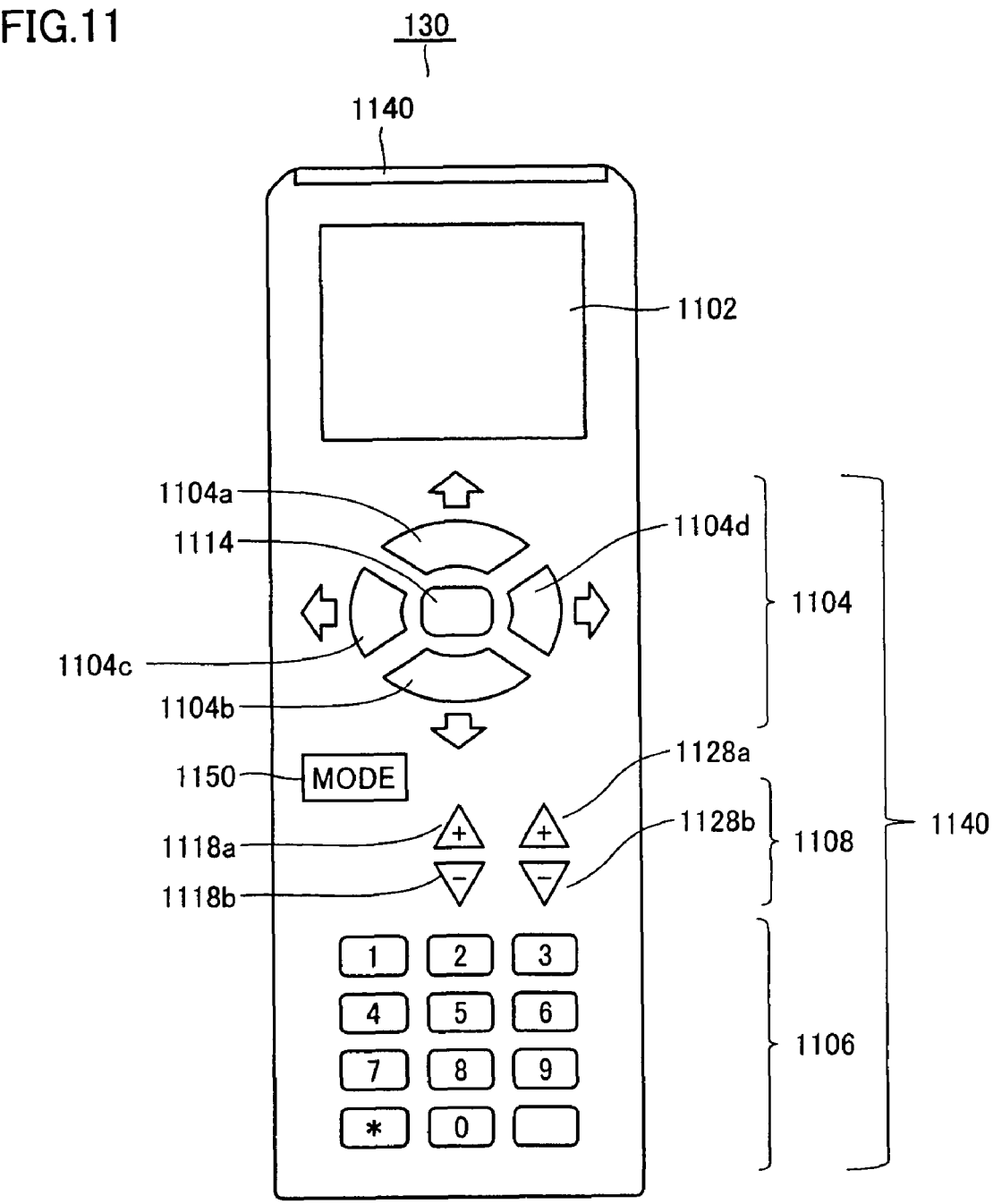
FIG. 11 shows a configuration of a remote controller 130 capable of transmitting data for identifying a person who operates remote controller 130.

With reference to FIG. 11, description will be given of a remote controller capable of transmitting data for identifying an operator of the remote controller (area 1040). FIG. 11 shows a configuration of remote controller 130 having such a function. Remote controller 130 includes a light emitting unit 1140 emitting a control signal to an appliance to be controlled, a display 1102 displaying character information, and an operating unit 1140 receiving an input of a command from an external device, thereby outputting a signal in accordance with the input.

Operating unit 1140 is realized by, for example, a button or a dial. Operating unit 1140 includes cursor buttons 1104a, 1104b, 1104c and 1104d instructing a cursor displayed on display 1102 to move vertically and horizontally, respectively, a decision button 1114 accepting an input of a command for defining data inputted by a user of remote controller 130, an up-down button 1108 increasing/decreasing a value of control data contained in an outputted control signal, and a numerical button 1106. Up-down button 1108 includes buttons 1118a and 1128a each accepting a command for increasing the value of the control data, and buttons 1118b and 1128b each accepting a command for decreasing the value of the control data.

Remote controller 130 further includes a button 1150 accepting a command for switching an operating mode of remote controller 130. When the user of remote controller 130 operates button 1150 and numerical button 1106 in combination at an identical timing, thereafter, a control signal is transmitted as an operation by the user which is previously related with a numeral specified by numerical button 1106.

Figure 12:
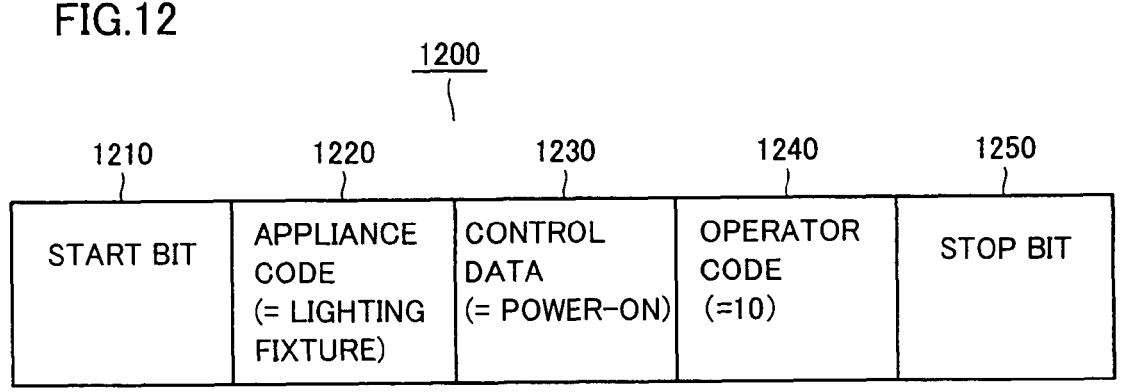
FIG. 12 shows a configuration of an infrared signal 1200 transmitted by remote controller 130.

With reference to FIG. 12, next, description will be given of an infrared signal transmitted by remote controller 130. FIG. 12 shows a configuration of infrared signal 1200. Infrared signal 1200 includes a start bit 1210, an appliance code 1220, control data 1230, an operator code 1240, and a stop bit 1250.

Start bit 1210 represents a front end of infrared signal 1200. Appliance code 1220 corresponds to data for specifying an appliance controlled by remote controller 130. As shown in FIG. 12, for example, infrared signal 1200 is specified as a signal controlling a lighting fixture 110. Control data 1230 corresponds to a concrete control item related with the appliance specified by appliance code 1220. Operator code 1240 represents a user who operates remote controller 130 when infrared signal 1200 is transmitted. Stop bit 1250 represents a terminal end of infrared signal 1200. Concretely, infrared signal 1200 is specified as a control signal transmitted such that an operator "10" turns on lighting fixture 110.

Figure 13:
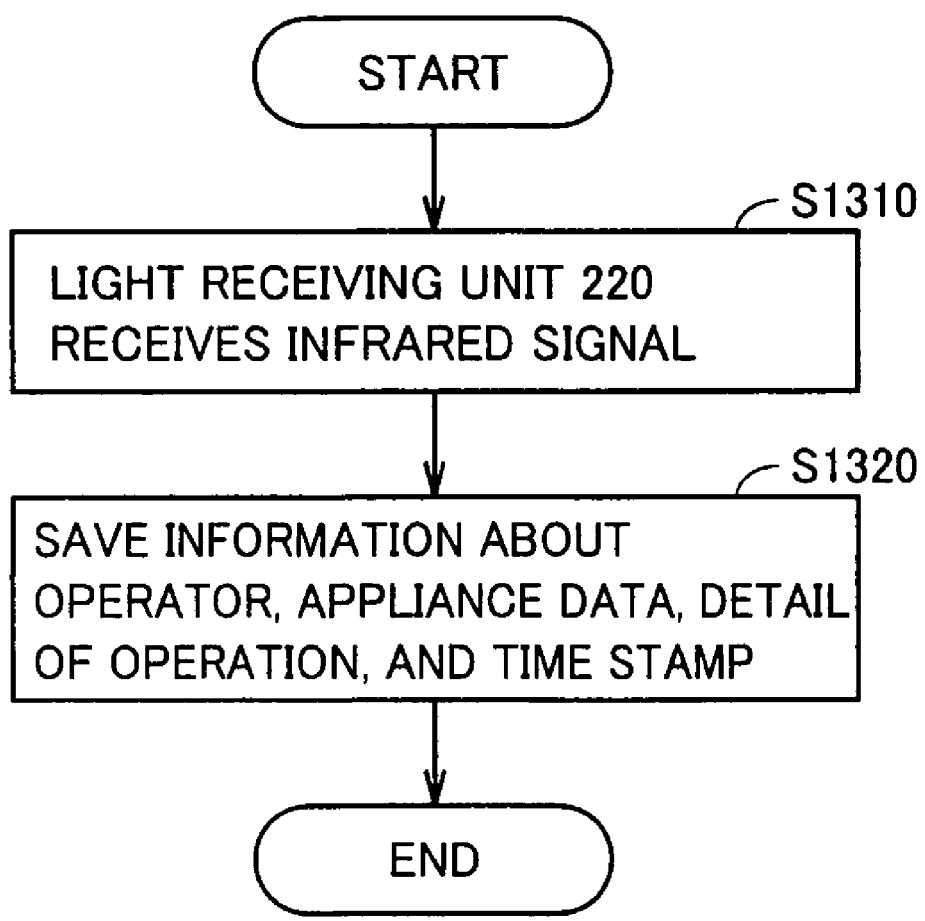
FIG. 13 is a flowchart showing a procedure of processing performed by surveillance camera 100 upon reception of an infrared signal from remote controller 130.
Figure 14:
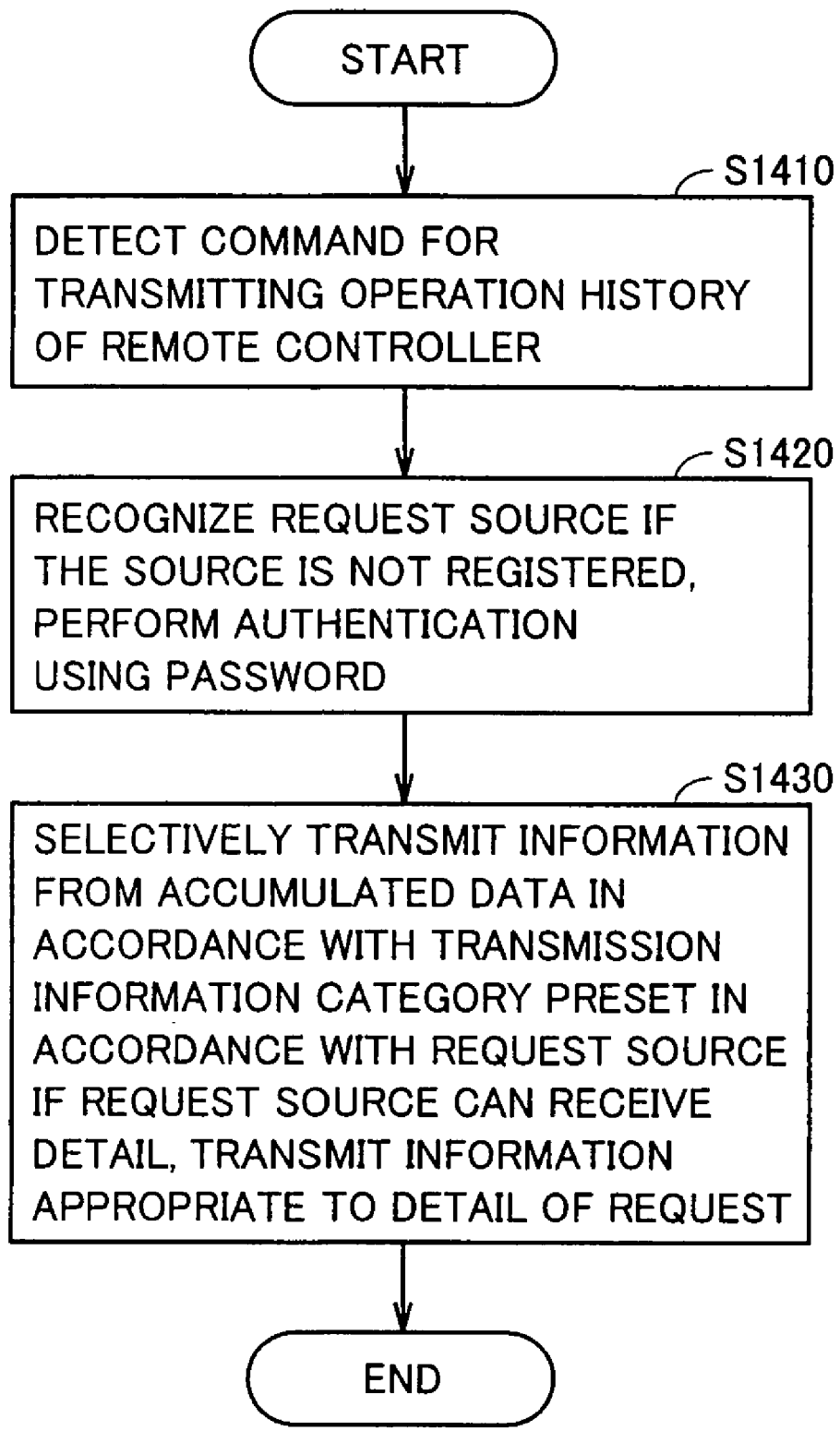
FIG. 14 is a flowchart showing a procedure of processing performed by surveillance camera 100 in order to transmit an operation history to a specific user.

With reference to FIGS. 13 and 14, description will be given of a control structure of surveillance camera 100 according to this embodiment. FIG. 13 is a flowchart showing a procedure of processing performed by surveillance camera 100 upon reception of an infrared signal from remote controller 130.

In step S1310, a light receiving unit 220 of surveillance camera 100 receives an infrared signal transmitted from remote controller 130. Light receiving unit 220 converts the infrared signal into an electric signal, and sends the electric signal to a control unit 210. Control unit 210 extracts data for identifying an operator, an appliance code, and a detail of an operation from the signal sent from light receiving unit 220. Further, control unit 210 relates time information (a time stamp) sent from an internal clock (not shown) with the extracted data, and stores the resultant in storage unit 230 (FIG. 10).

FIG. 14 is a flowchart showing a procedure of processing performed by surveillance camera 100 in order to transmit an operation history to a specific user. This processing is performed, for example, when a transmission request is received from an external user (a user of portable telephone 180 or a user of PC 170) or when control unit 210 senses the arrival of a preset time.

In step S1410, control unit 210 detects a command for transmitting an operation history of remote controller 130. In step S1420, control unit 210 recognizes a transmission source of the transmission command (i.e., a request source of the operation history). Concretely, control unit 210 compares an address contained in the transmission command with an address stored in storage unit 230, and determines whether or not the transmission command is issued by a user registered previously. If control unit 210 determines that a request source of the transmission command is a user which is not registered previously, control unit 210 sends a command for encouraging an input of a password to the request source, and commences access processing secured in security. If the request source is recognized successively in step S1420, thereafter, transmission processing is performed. However, if such recognition is failed, transmission processing for the operation history based on the transmission command is not performed. Herein, a well-known technique is applied as the access processing using a password. For example, it is sufficient that a password is previously preserved in surveillance camera 100, and authentication processing is performed by comparison of the password with an inputted password.

In step S1430, control unit 210 selectively acquires a preserved operation history on the basis of an operation information category (area 1060) preset in storage unit 230 in accordance with a request source of the operation history. Concretely, control unit 210 specifies a transmission mode (area 1060) related with a request source specified by data in area 1050. Control unit 210 refers to transmission mode 1060 to specify a data item to be transmitted. Control unit 210 makes a search in areas 1010 to 1040 by using the specified item as a key, and extracts a concrete data item. Control unit 210 temporarily stores the extracted data item in storage unit 230, and generates a packet for transmission by using the data and a transmission destination specified previously. For example, this packet has a configuration similar to that of packet 700 shown in FIG. 7. In this embodiment, a plurality of items are stored in data 720 in accordance with transmission modes in some cases.

As described above, with surveillance camera 100 according to this embodiment, operation information about a remote controller can be transmitted for each user registered previously. In addition, a detail of the information to be transmitted is changeable for each user. With this configuration, it is possible to grasp action for each specific user. Therefore, it is possible to watch the user by a family in a remote place with good accuracy.

Third Embodiment

Hereinafter, description will be given of a third embodiment of the present invention. A surveillance camera according to this embodiment is different from the surveillance camera according to each of the aforementioned embodiments in the following point. That is, the surveillance camera according to this embodiment has a function of displaying data received in response to transmission of an operation history.

Figure 15:
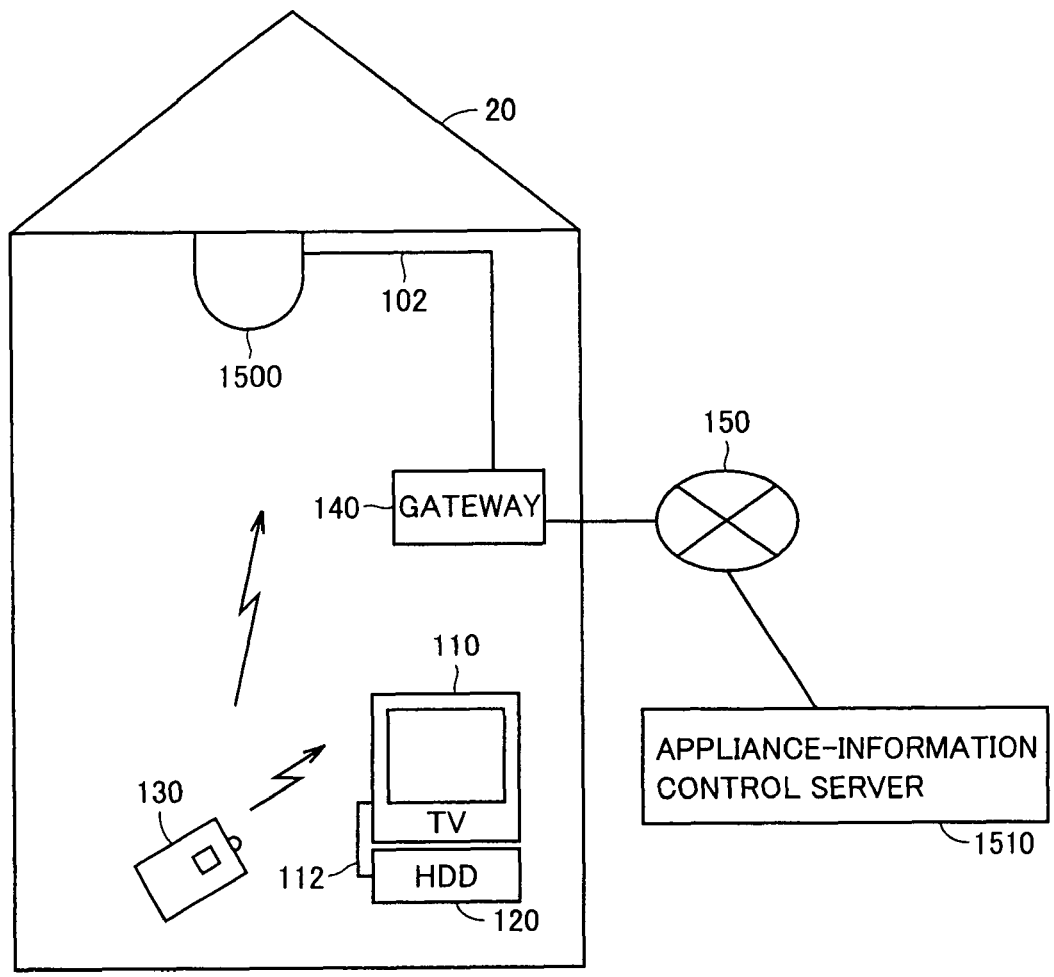
FIG. 15 shows a configuration of a network on which a surveillance camera 1500 according to a third embodiment of the present invention is used.

With reference to FIG. 15, description will be given of a network configuration on which surveillance camera 1500 according to this embodiment is used. Surveillance camera 1500 is connected to gateway 140 via cable 102. Gateway 140 is connected to Internet 150. An appliance-information management server 1510 is also connected to Internet 150.

A Control unit 210 realizing surveillance camera 1500 acquires information for recognizing the appliance through communication unit 260. Concretely, control unit 210 generates a request for transmitting information about the appliance, and causes communication unit 260 to transmit the transmission request to appliance-information management server 1510.

The other configurations are equal to those shown in FIG. 1. Therefore, description thereof will not be given here.

Figure 16:
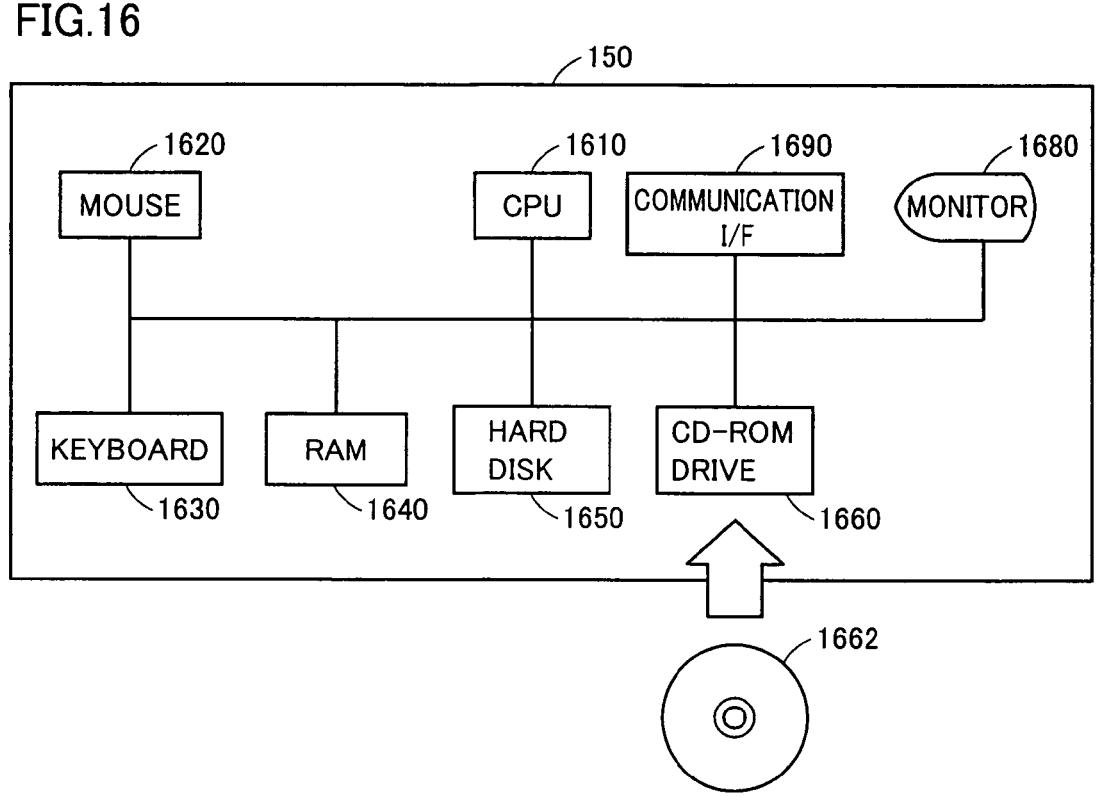
FIG. 16 is a block diagram showing a hardware configuration of a computer system functioning as an appliance-information management server 1510.

With reference to FIG. 16, description will be given of appliance-information management server 1510. FIG. 16 is a block diagram showing a hardware configuration of a computer system functioning as appliance-information management server 1510. Appliance-information management server 1510 mainly includes a CPU 1610 connected to appliance-information management server 1510 via a data bus, a mouse 1620 and a keyboard 1630 each accepting a command inputted by an administrator of appliance-information management server 1510, a RAM (Random Access Memory) 1640 temporarily storing inputted data or data generated by processing performed in accordance with a program, a hard disk 1650 capable of storing data in a nonvolatile manner, a CD-ROM (Compact Disk-Read Only Memory) drive 1660, a monitor 1680, and a communication IF (Interface) 1690. A CD-ROM 1662 can be inserted into/removed from CD-ROM drive 1660. Communication IF 1690 is connected to the Internet 150.

The processing in the computer system functioning as appliance-information management server 1510 can be realized by a program executed by CPU 1610 and hardware operated in accordance with execution of the program. Such a program is previously stored in RAM 1640 or hard disk 1650 in some cases. Alternatively, the program is distributed as a program product while being stored in CD-ROM 1662 or any other data recording medium in some cases. Data stored in a data recording medium is read from the data recording medium by CD-ROM drive 1660 or any other reader and, then, is temporarily stored in hard disk 1650.

The program is read from RAM 1640 or hard disk 1650 and, then, is executed by CPU 1610. The hardware shown in FIG. 16 is typical. Accordingly, an essential part for realizing appliance-information management server 1510 is the program stored in RAM 1640, hard disk 1650, CD-ROM 1662 or any other data recording medium. The operation of the hardware is readily understood by a person skilled in the art. Therefore, detailed description thereof will not be given here.

Figure 17:
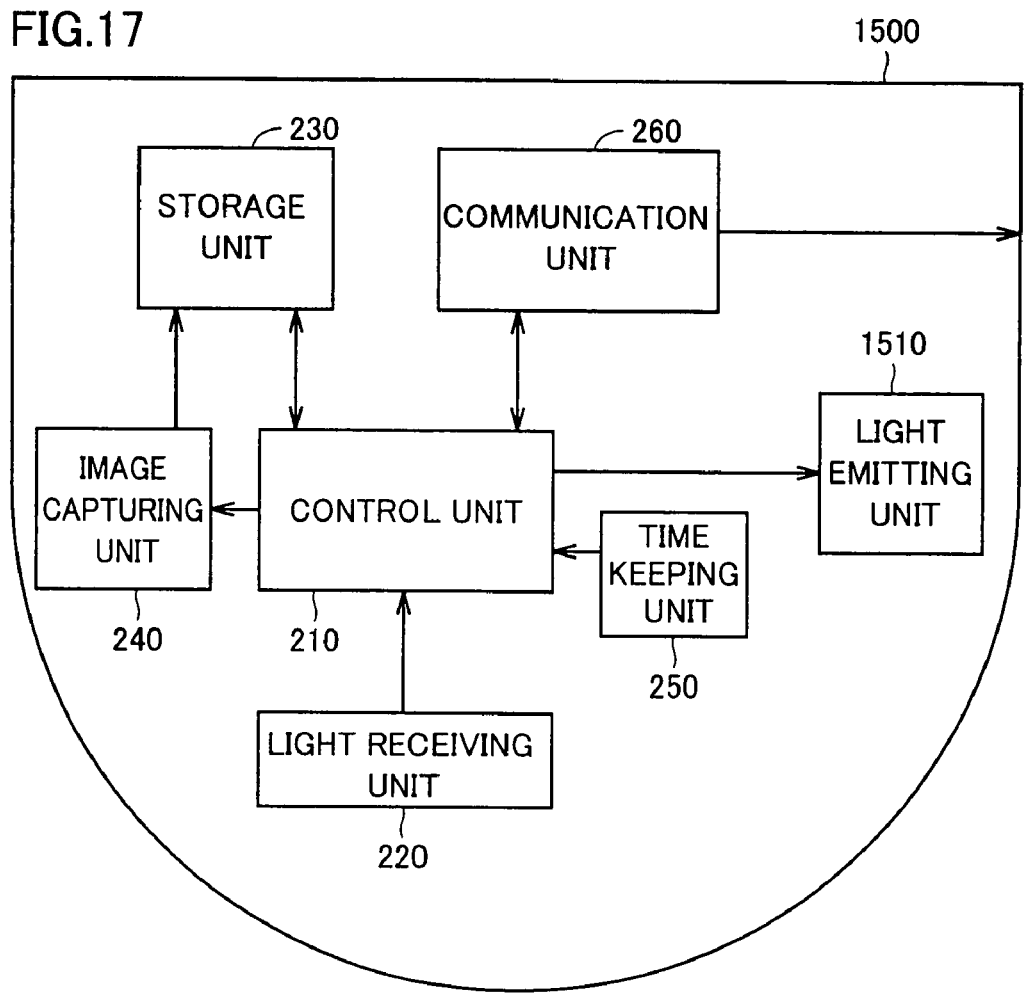
FIG. 17 is a block diagram showing a hardware configuration of surveillance camera 1500.

With reference to FIG. 17, description will be given of a structure of surveillance camera 1500. FIG. 17 is a block diagram showing a hardware configuration of surveillance camera 1500. Surveillance camera 1500 includes a light emitting unit 1510 in addition to the configurations shown in FIG. 2.

Light emitting unit 1510 generates an infrared signal on the basis of a control signal outputted from control unit 210, and emits the infrared signal within a predetermined range. For example, the control signal contains a control code for controlling an operation of an appliance. The appliance is television set 110, HDD recorder 120 or any other electric product which can be installed in house 20.

Figure 18:
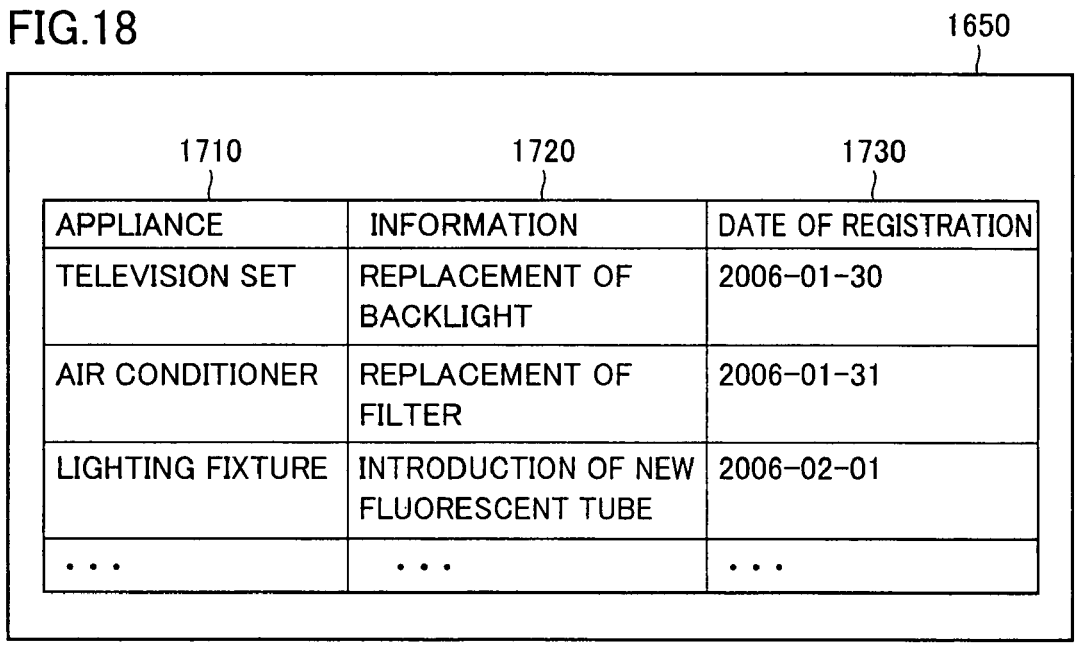
FIG. 18 conceptually shows one example of data stored in a hard disk 1650 of appliance-information management server 1510.

With reference to FIG. 18, description will be given of a data structure of appliance-information management server 1510. FIG. 18 conceptually shows one example of data stored in hard disk 1650. Hard disk 1650 includes areas 1710 to 1730 each storing data.

Area 1710 stores data for specifying an appliance serving as a target for information provision. Area 1720 stores a concrete detail of information provided with regard to the appliance. Area 1730 stores data about a registration date on which the information is stored in hard disk 1650. The data stored in area 1710, the data stored in area 1720, the data stored in area 1730 are related with each other. Accordingly, when any of the areas is specified, another information related with an item contained in the area can be specified.

CPU 1610 of appliance-information management server 1510 refers to data stored in hard disk 1650, and generates a packet by using the data. The packet is transmitted to an appliance requesting provision of information. CPU 1610 generates the packet and, then, sends the packet to the Internet 150 through communication IF 1690. The packet is transmitted to an address designated on the basis of an incorporated address.

Figure 19:
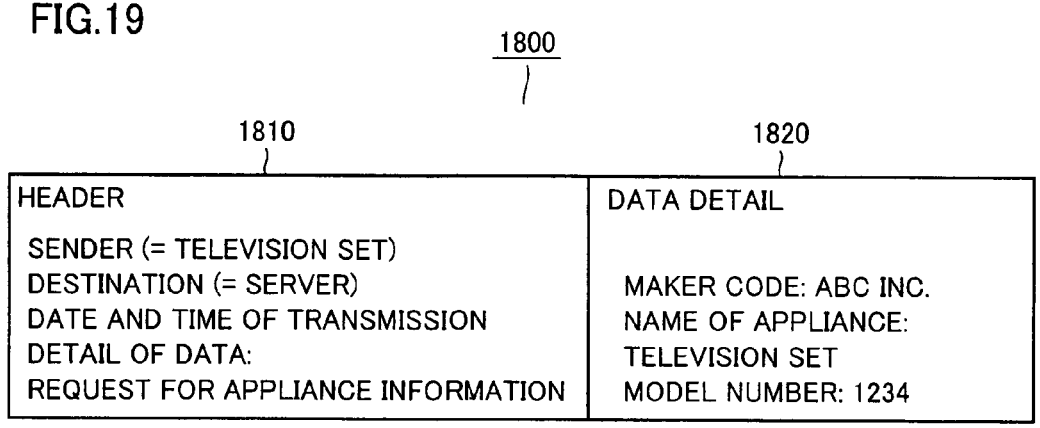
FIG. 19 conceptually shows a configuration of a packet 1800 transmitted from surveillance camera 1500 to appliance-information management server 1510.

With reference to FIGS. 19 and 20, next, description will be given of communications between surveillance camera 1500 according to this embodiment and appliance-information management server 1510. FIG. 19 conceptually shows a configuration of a packet 1800 transmitted from surveillance camera 1500 to appliance-information management server 1510. Packet 1800 contains a header 1810 and a data detail 1820.

Header 1810 contains data for specifying a transmission source of packet 1800 (i.e., surveillance camera 1500), data for specifying an address to which packet 1800 is transmitted (appliance-information management server 1510), date and time at which packet 1800 is transmitted, and data about an attribute of packet data 1800 (a data detail). The data detail is, for example, data representing that packet 1800 requests information about what kind of appliance.

Data detail 1820 includes a concrete item related with the data detail contained in header 1810. Concretely, data detail 1820 includes a maker code of an appliance (ABC Inc.), a designation of the appliance (television set), and a model number of the appliance (1234).

FIG. 20 conceptually shows a configuration of packet 1900 transmitted from appliance-information management server 1510 to surveillance camera 1500. Packet 1900 contains a header 1910 and a data detail 1920.

Header 1910 contains data for specifying a transmission source of packet 1900 (an address for specifying a position of appliance-information management server 1510 on the Internet 150), data for specifying an address of packet 1900 (e.g., an address of surveillance camera 1500 on the network), date and time at which packet 1900 is transmitted, and attribute information indicating a detail of data transmitted with packet 1900 (e.g., "transmission of appliance information").

Data detail 1920 contains a maker code for specifying a manufacturer of an appliance with which information is related, an appliance designation for specifying the appliance, a model number for specifying a type of the appliance, and concrete appliance information. In this example, packet 1900 is transmitted with text information (product-info.text), an image (product-image.jpg) and audio data (bgm.audio) as information about an appliance "television set".

Figure 21:
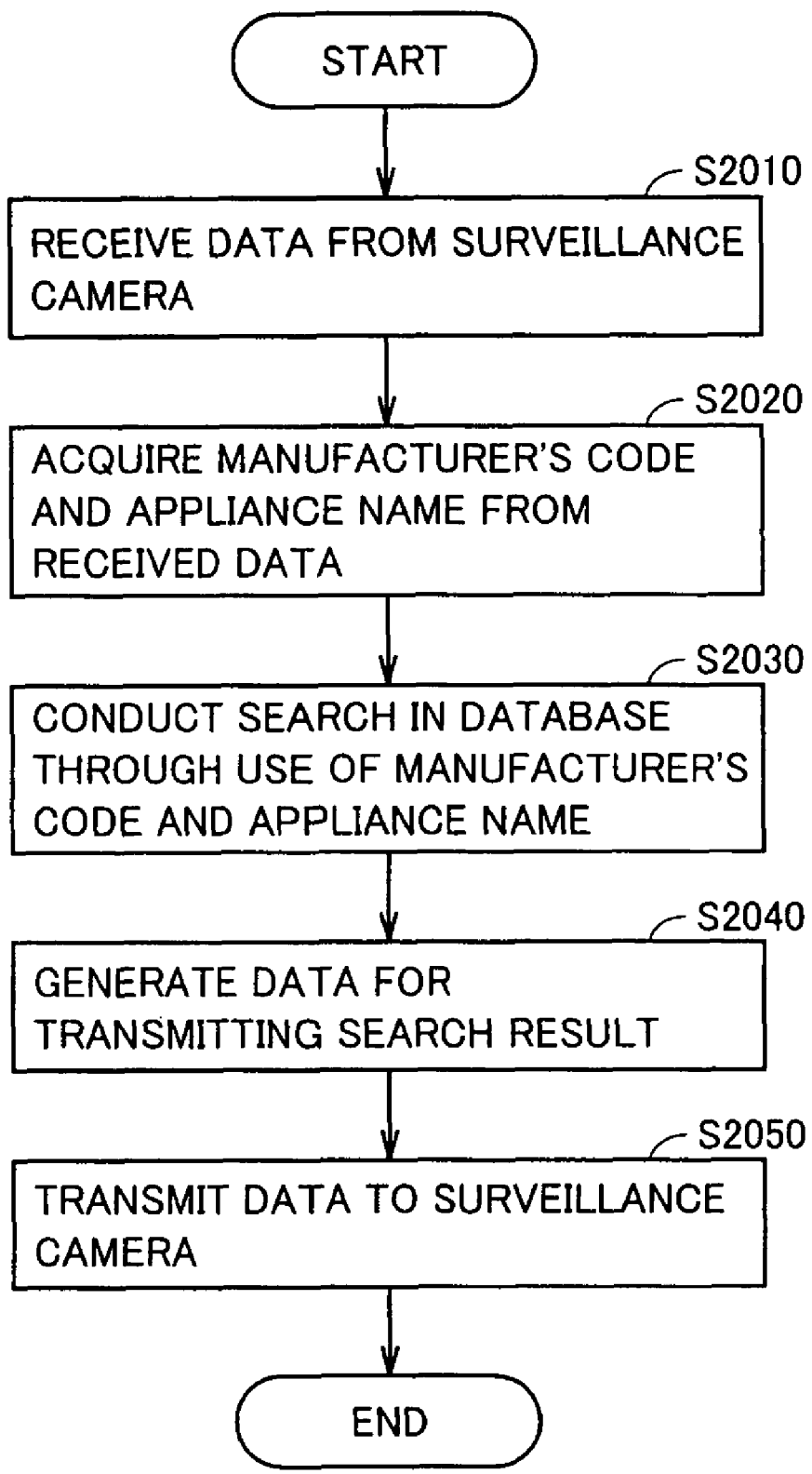
FIG. 21 is a flowchart showing a procedure of processing performed by a CPU 1610 of appliance-information management server 1510.

With reference to FIG. 21, next, description will be given of a control structure of appliance-information management server 1510. FIG. 21 is a flowchart showing a procedure of processing performed by CPU 1610 of appliance-information management server 1510.

In step S2010, CPU 1610 senses reception of data about a transmission request of appliance information (packet 1800 in FIG. 19) from surveillance camera 1500 on the Internet 150, on the basis of an inputted signal. In step S2020, CPU 1610 acquires information such as a maker code, an appliance designation and a model number (data detail 1820) from packet 1800, and writes the acquired information to an area secured temporarily in RAM 1640.

In step S2030, CPU 1610 refers to the data written to RAM 1640 to perform a search in a database in hard disk 1650 (FIG. 18). In step S2040, CPU 1610 generates data for transmitting appliance information in RAM 1640 on the basis of the result of the search in the database. Thereafter, CPU 1610 generates packet 1900 for transmitting the search result through the use of the transmission source (header 1810) contained in packet 1800 received in step S2010.

In step S2050, CPU 1610 sends generated packet 1900 to the Internet 150 through communication IF 1690. Thus, if surveillance camera 1500 is connected to the Internet 150, packet 1900 is received by surveillance camera 1500.

Figure 22:
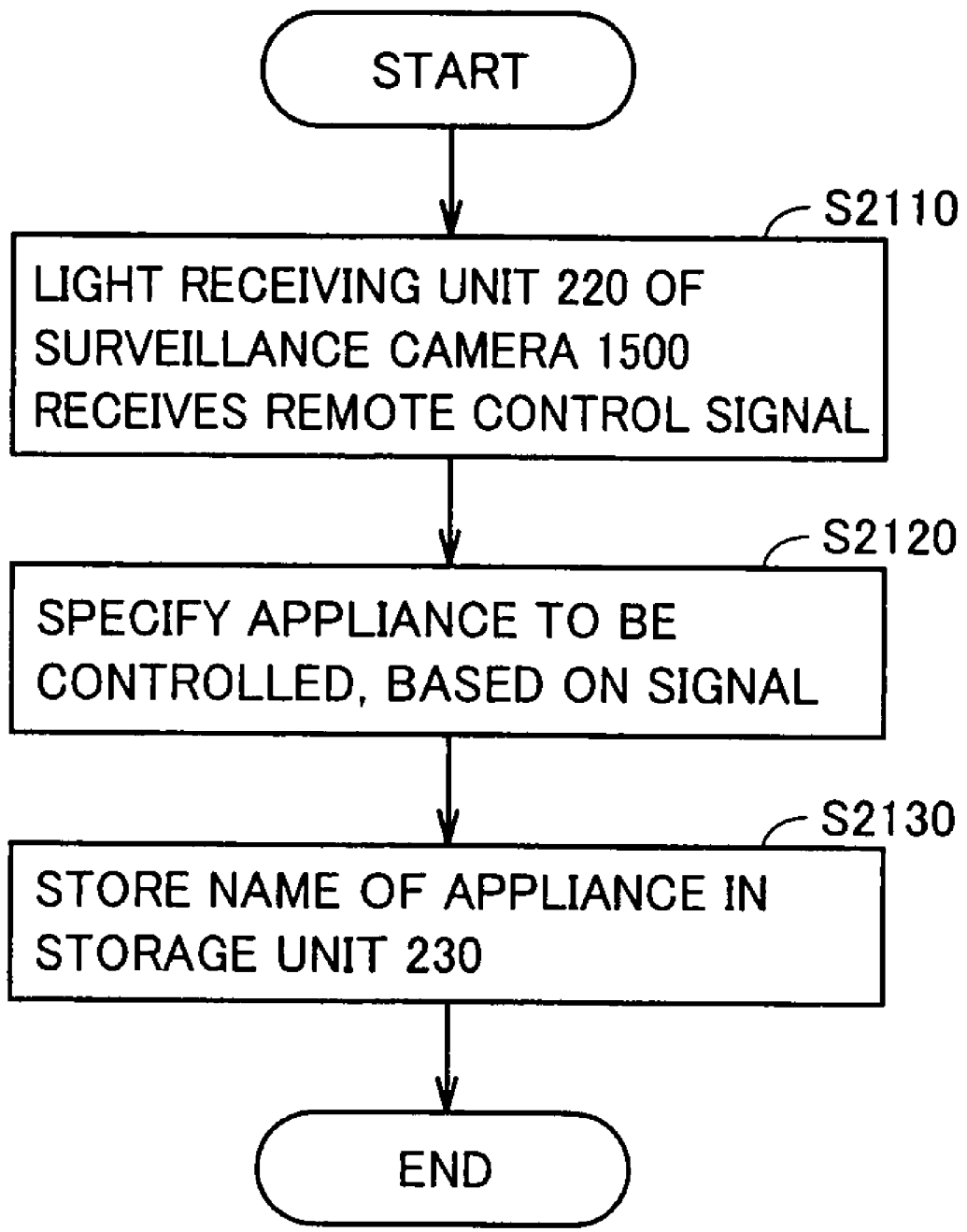
FIG. 22 is a flowchart showing a procedure of processing performed by surveillance camera 1500 upon reception of an infrared signal from a remote controller 130.
Figure 23:
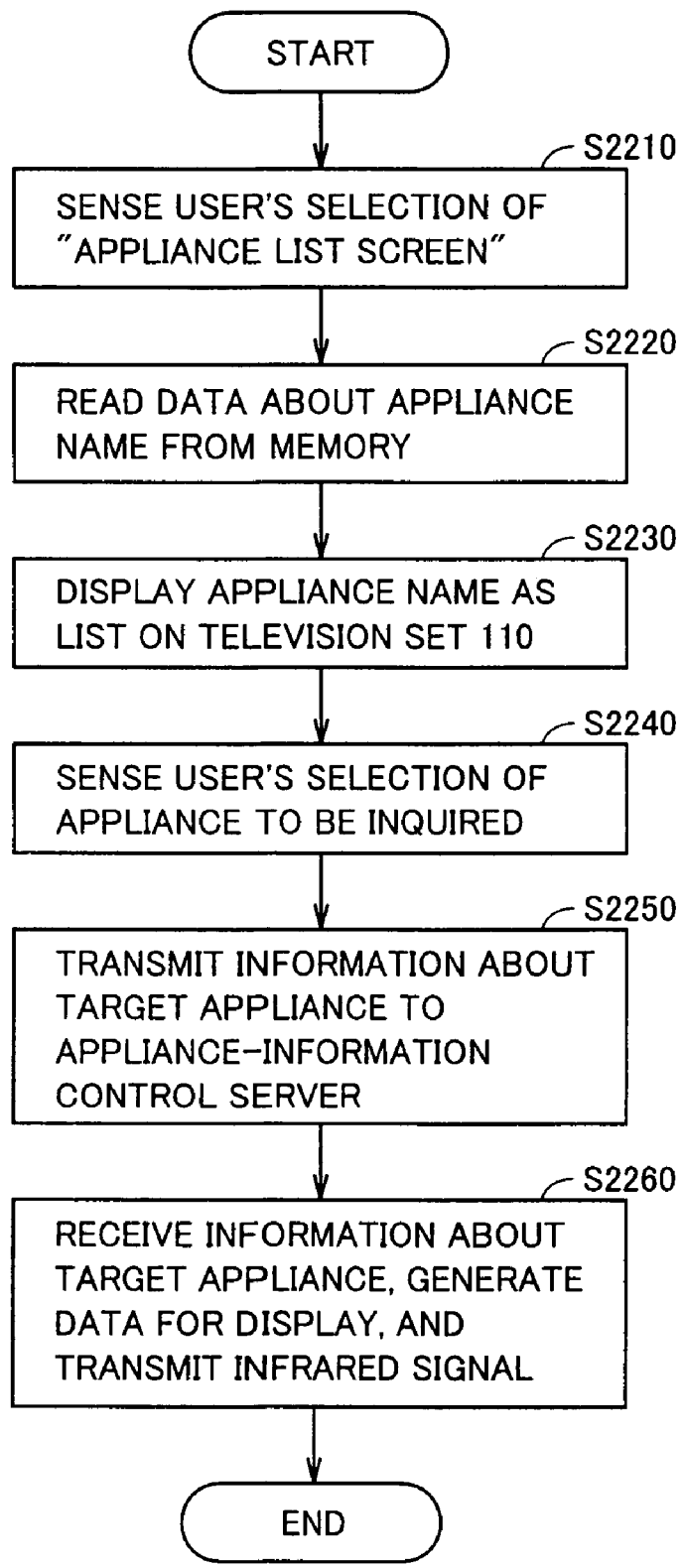
FIG. 23 is a flowchart showing a procedure of processing realized when a user performs predetermined connection processing in order to acquire appliance information.

With reference to FIGS. 22 and 23, next, description will be given of a control structure of surveillance camera 1500 according to this embodiment. FIG. 22 is a flowchart showing a procedure of processing performed by surveillance camera 1500 upon reception of an infrared signal from remote controller 130.

In step S2110, control unit 210 senses a fact that light receiving unit 220 of surveillance camera 1500 receives a remote control signal. In step S2120, control unit 210 specifies an appliance to be controlled by remote controller 130, on the basis of the signal. In step S2130, control unit 210 preserves a designation of the specified appliance in an area reserved in storage unit 230.

FIG. 23 is a flowchart showing a procedure of processing realized when a user performs predetermined connection processing in order to acquire appliance information.

In step S2210, control unit 210 of surveillance camera 1500 senses a fact that a user chooses "appliance list screen". The sensing is performed when surveillance camera 1500 receives an infrared signal containing a signal for instructing such choice, for example.

In step S2220, control unit 210 reads data about a designation of the appliance, which is registered previously, from storage unit 230. In step S2230, control unit 210 generates a signal for display on the basis of the read data, and causes television set 110 to display a list of appliance designations on the basis of the generated signal. Concretely, control unit 210 generates data for displaying the list and allows light emitting unit 1510 to emit an infrared signal containing the list. Television set 110 receives the signal and, then, displays the list on a display unit (not shown).

In step S2240, control unit 210 senses a fact that the user chose an appliance to be inquired about information, on the basis of the infrared signal received by light receiving unit 220. For example, the user, who is a viewer of television set 110, operates remote controller 130 for such a choice, a signal generated by the operation is received by surveillance camera 1500. The choice is sensed by this reception of the signal.

In step S2250, control unit 210 generates data for an inquiry about the information of the appliance, and transmits the data to appliance-information management server 1510 through communication unit 260. Appliance-information management server 1510 receives the data and, then, performs the aforementioned processing (FIG. 21).

In step S2260, control-unit 210 receives the information about the target appliance, which is transmitted by appliance-information management server 1510, through communication unit 260, generates data for displaying characters on the basis of the information, and causes light emitting unit 1510 to emit an infrared signal containing the data. As a result, if television set 110 is turned on, television set 110 displays the information of the appliance on the basis of the infrared signal. If the received information contains image data or audio data, such data may be contained in the infrared signal transmitted from surveillance camera 1500. In this case, television set 110 displays video on the basis of the image data and outputs sound on the basis of the audio data.

Figure 24:
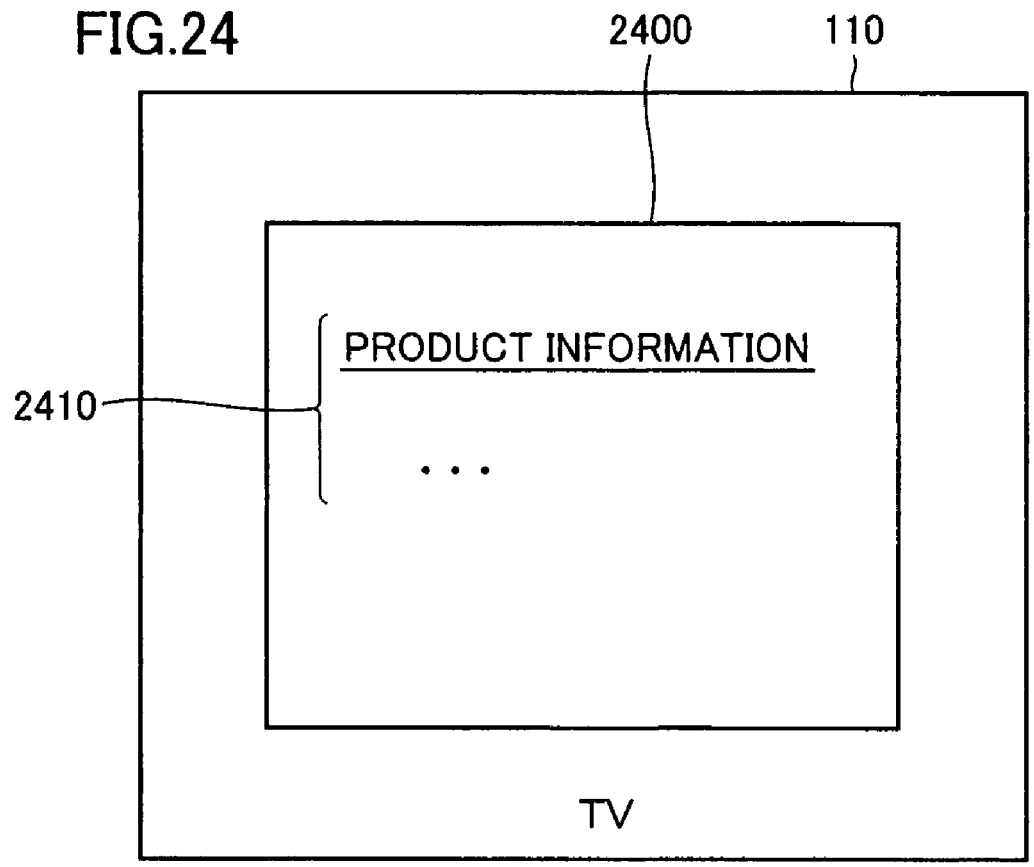
FIG. 24 shows a screen of a television set 110 displaying appliance information.

FIG. 24 shows a screen of television set 110 displaying the appliance information. In television set 110, display 112 displays pertinent information to the appliance based on the received information. Concretely, television set 110 displays product information or any other information about the appliance chosen by the user in the form of, for example, character information 2410.

As described above, with surveillance camera 1500 according to this embodiment, a user can acquire product information about a specific appliance, information about a pertinent product and any other information. Such information is displayed on a device capable of displaying characters, such as television set 110. Thus, it is possible to notify a user of appliance information. Therefore, it is possible to effectively utilize a communication function of surveillance camera 1500.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A surveillance device comprising:
an image capturing unit capturing an image of a subject and outputting an image signal;
a light receiving unit receiving an infrared signal having control data for controlling an operation of an appliance;
a storage unit storing said control data contained in the infrared signal received by said light receiving unit, and access data for communication with an information communication device registered previously;
a time keeping unit detecting a time;
a control unit sending a signal for instructing said image capturing unit to perform said image capturing operation when said light receiving unit receives no infrared signal for a predetermined period of time; and
a transmission unit, connected to a communication line, transmitting the image signal generated on the basis of the image captured by said image capturing unit to the information communication device registered previously via said communication line on the basis of said access data.

2. A surveillance device comprising:
an image capturing unit capturing an image of a subject and outputting an image signal;
a light receiving unit receiving an infrared signal having control data for controlling an operation of an appliance;
a storage unit storing said control data contained in the infrared signal received by said light receiving unit;
a control unit causing said image capturing unit to perform said image capturing operation on the basis of a history of reception of said infrared signal;
a transmission unit, connected to a communication line, transmitting the image signal generated on the basis of the image captured by said image capturing unit to an information communication device registered previously via said communication line; and
a time keeping unit detecting a time, wherein
said control unit sends a signal for instructing said image capturing unit to operate said image capturing operation when said light receiving unit receives no infrared signal for a predetermined period of time.

3. The surveillance device according to claim 2, further comprising:
a reception unit, connected to said communication line, receiving a signal containing a command, wherein
said control unit causes said image capturing unit to perform said image capturing operation on the basis of said command.

4. The surveillance device according to claim 2, wherein
said control data is related with data about a time at which said infrared signal is received, and
said control unit includes:
a capturing control unit causing said image capturing unit to perform said image capturing operation in response to reception of said infrared signal;
a relating unit relating an image signal generated on the basis of said image capturing operation with said control data to store, the resultant in said storage unit;
an acquisition unit acquiring said control data, contained in said infrared signal received lastly, from said storage unit on the basis of said time data; and
a transmission control unit controlling said transmission unit so as to transmit said image signal, related with said control data acquired by said acquisition unit, to said information communication device registered previously.

5. The surveillance device according to claim 2, further comprising:
a light emitting unit emitting an infrared signal; and
a receiving unit, connected to said communication line, receiving a signal, wherein
said signal contains a command for controlling an appliance operated on the basis of said control data, and
said control unit includes:
a sensing unit sensing the reception of a signal containing said command; and
an appliance control unit causing said light emitting unit to emit an infrared signal containing said control data, in response to the sensing of said reception.

6. The surveillance device according to claim 2, wherein
said control unit includes:
an acquisition unit acquiring appliance information for specifying said appliance, on the basis of said control data; and a transmission control unit controlling said transmission unit so as to transmit said appliance information to an information providing device connected to said communication line in order to provide information about said appliance, through said communication line.

7. The surveillance device according to claim 6, further comprising:
a receiving unit, connected to said communication line, receiving service information about said appliance provided by said information providing device; and
an output unit outputting said service information.

8. The surveillance device according to claim 2, further comprising:
an abnormality detection unit detecting an operating abnormality regarding said appliance, on the basis of a plurality of pieces of control data each stored in said storage unit.

9. The surveillance device according to claim 8, wherein
said storage unit stores first control data and second control data each outputted through a single operation, and
said abnormality detection unit compares said first control data with said second control data to detect the operating abnormality regarding said appliance.

10. The surveillance device according to claim 2, wherein
said control data contains data switching the operation of said appliance, and
said control unit senses the reception of the data for switching the operation of said appliance and, then, causes said image capturing unit to perform the image capturing operation.

11. The surveillance device according to claim 10, wherein
the data for switching the operation of said appliance contains switching data for switching between power-on and power-off of said appliance, and
said control data causes said image capturing unit to perform the image capturing operation on the basis of sensing of reception of said switching data.

* * * * *